United States Patent
Hu et al.

(10) Patent No.: US 8,948,087 B2
(45) Date of Patent: Feb. 3, 2015

(54) METHOD AND SYSTEM FOR IMPLEMENTING DOMAIN SELECTION DURING THE TERMINATED CALL

(75) Inventors: Ying Hu, Shenzhen (CN); Zhijun Li, Shenzhen (CN); Changle Zou, Shenzhen (CN); Zhenhua Xie, Shenzhen (CN); Zhihai Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 150 days.

(21) Appl. No.: 13/259,440

(22) PCT Filed: Apr. 23, 2010

(86) PCT No.: PCT/CN2010/072121
§ 371 (c)(1), (2), (4) Date: Jun. 14, 2012

(87) PCT Pub. No.: WO2010/148754
PCT Pub. Date: Dec. 29, 2010

(65) Prior Publication Data
US 2012/0269117 A1    Oct. 25, 2012

(30) Foreign Application Priority Data
Jan. 12, 2010    (CN) .......................... 2010 1 0000616

(51) Int. Cl.
*H04W 4/00* (2009.01)
*H04L 29/06* (2006.01)
*H04L 12/715* (2013.01)
*H04W 8/12* (2009.01)
*H04W 48/18* (2009.01)
(Continued)

(52) U.S. Cl.
CPC ............ *H04L 65/1016* (2013.01); *H04L 45/04* (2013.01); *H04W 8/12* (2013.01);
(Continued)

(58) Field of Classification Search
CPC .......... H04W 40/02; H04W 8/04; H04W 8/12
See application file for complete search history.

(56) References Cited

U.S. PATENT DOCUMENTS

| 2007/0238466 A1 | 10/2007 | Buckley et al. | |
|---|---|---|---|
| 2009/0238143 A1* | 9/2009 | Mukherjee et al. | 370/331 |
| 2009/0270099 A1* | 10/2009 | Gallagher et al. | 455/435.1 |

FOREIGN PATENT DOCUMENTS

| CN | 1842211 A | 10/2008 |
|---|---|---|
| CN | 101448245 A | 6/2009 |

(Continued)

OTHER PUBLICATIONS

Search Report, EP, Mar. 13, 2014.
(Continued)

*Primary Examiner* — David Oveissi
(74) *Attorney, Agent, or Firm* — Joseph H. Kim; JHK Law

(57) ABSTRACT

The present application discloses a method and a system for implementing domain selection during a terminated call, in which an application server (AS) sends, according to a received call request message, a query request message to a home subscriber server (HSS); the HSS queries, according to the query request message, a packet switching (PS) domain mobility management network element to obtain information of a called terminal and/or a network accessed by the called terminal in the call request message; the HSS feeds back the obtained information of the called terminal and/or the network accessed by the called terminal to the AS; and the AS selects a domain to which a call message is to be routed according to the information of the called terminal and/or the network accessed by the called terminal.

18 Claims, 10 Drawing Sheets

(51) Int. Cl.
*H04W 8/04* (2009.01)
*H04W 40/02* (2009.01)

(52) U.S. Cl.
CPC ....... *H04L 65/1046* (2013.01); *H04L 65/1063* (2013.01); *H04L 65/1073* (2013.01); *H04L 65/1069* (2013.01); *H04W 48/18* (2013.01); *H04W 8/04* (2013.01); *H04W 40/02* (2013.01); *Y02B 60/43* (2013.01)
USPC .......................... 370/328; 370/352; 370/392

(56) References Cited

FOREIGN PATENT DOCUMENTS

| | | | |
|---|---|---|---|
| CN | 101577955 A | 11/2009 | |
| EP | 224 440 A1 * | 1/2009 | ............ H04W 48/18 |
| EP | 2 302 844 | 7/2009 | |
| EP | 2 148 521 | 1/2010 | |
| WO | 2008/138252 | 11/2008 | |
| WO | WO 2011072747 A1 | 6/2011 | |

OTHER PUBLICATIONS

Ericsson "Network-based solution to improve T-ADS in the SCC AC," SA WG2 Meeting #76, Nov. 16-20, 2009.

ZTE "Discussion on voice domain selection for terminating call and ISR," SA WG2 Meeting #76, Nov. 16-20, 2009.

ZTE "HSS-based solutions to improve T-ADS in the SCC AS," 3GPP TSG SA WG2 Meeting #77, Jan. 18-22, 2010.

ZTE "IMS Voice over PS indication retrieved by the HSS," 3GPP TSG-SA WG2 Meeting #77, Jan. 18-22, 2010.

* cited by examiner

METHOD AND SYSTEM FOR IMPLEMENTING DOMAIN SELECTION DURING THE TERMINATED CALL

CROSS REFERENCE TO RELATED APPLICATIONS

This application is a National Phase application, filed under 35 U.S.C. §371, of PCT Application No. PCT/CN2010/072121, filed Apr. 23, 2010, which claims the benefit of priority to Chinese Patent Application No. 201010000616.0, filed on Jan. 12, 2010, the contents of which are incorporated herein by reference in their entirety.

FIELD OF THE INVENTION

The present invention relates to communication field, and in particular to a method and a system for implementing domain selection during a terminated call.

BACKGROUND OF THE INVENTION

An internet protocol (IP) multimedia core network subsystem (IMS) is an IP-based network architecture put forward by the 3rd generation partnership project (3GPP), and establishes an open and flexible service environment. In an IMS service system, the control layer and the service layer are separated; and the control layer takes the responsibility of providing necessary functions such as triggering, routing, and charging to the service layer. Service triggering and controlling functions in the control layer are carried out by a call session control function (CSCF, wherein the CSCF is divided into three types: proxy, interrogating, and serving, wherein the serving CSCF (S-CSCF) takes primary responsibilities). The service layer comprises a series of application servers (AS), and provides specific service servings. The AS can be either an independent entity or an entity in the S-CSCF. The control layer controls the service triggering according to subscription information of users, invokes services on the AS, and implements service functions.

User equipments (UE) can access an IMS network through a packet switching (PS) domain of a 2G/3G network, can also access an IMS network through an evolved packet system (EPS) network which only consists of the PS domain, and can also access an IMS network through a circuit switching (CS) domain of a 2G/3G network and a media gateway control function (MGCF, which can implement a conversion between CS domain signalings and IMS network signalings) of the IMS network. A schematic architectural diagram of that a UE accesses an IMS network via the above various ways to implement the services is as shown in FIG. 1. When the UE is in an area covered by both the 2G/3G network and the EPS network, the UE can determine to access, according to circumstances, the PS domain of the EPS network, the CS domain of the EPS network, or the 2G/3G network.

In the prior art, considering that not all the network areas covered by the PS domain of the 2G/3G network and/or the EPS network support IMS voice over PS session (IMS VOIP) during network deployment especially during network evolution process, the 2G/3G network takes a routing area (RA) as granularity to distinguish IMS VOIP capability, and a serving CPRS support node (SGSN) knows the IMS VOIP capability of the UE in one routing area; and the EPS network takes a tracking area (TA) list as granularity to distinguish the IMS VOIP capability, and a mobility management entity (MME) knows the IMS VOIP capability of the UE in one tracking area.

The SGSN is a mobility management network element of the PS domain of the 2G/3G network; and the MME is a mobility management network element of the PS domain of the EPS network. Under a circumstance shown in FIG. 1, both the MME and the SGSN are independent network elements. During practical application and network deployment, both the MME and the SGSN can be a combo node (which is also called as composite node or combined node, i.e., combined MME/SGSN). The MME and the SGSN have similar functions, and both of the MME and the SGSN are the mobility management network elements of the PS domain, so a special node which integrates functions of both the SGSN and the MME may exist during a network evolvement process. The interface between the SGSN and the MME is an internal interface. The message communications between the MME and the SGSN comprised in the combo nodes are performed by way of internal messages or sharing internal memory. The combined node has simple network deployment, can reduce signaling intercommunication time delay among network elements, and may be used by some operators when the EPS system is deployed. When the network is deployed by using the combo node, if the UE initiates registration in a wireless access system and selects the combo node, when the UE moves to another wireless access system later, in the prior art, the combined node will be selected for the UE under a situation that the serving range is available.

As mentioned above, the UE can access the IMS to perform a session by above multiple ways. During a terminated call, in order to route the call to the UE effectively, the IMS network needs to perform the domain selection. In the related art, in order to improve the effect of domain selection during the terminated call, an implementation method is a method for domain selection on the basis of information such as the IMS VOIP capability provided by a home subscriber server (HSS). The concept of the method is as follows: when the UE performs attach/update process, the SGSN/MME notifies the HSS whether an area currently being accessed by the UE supports the IMS VOIP by an update location message; and afterwards when the VOIP in the area to which the UE accesses is changed, the SGSN/MME also needs to send a message to notify the HSS. During the terminated call, the AS queries the HSS to obtain the related information such as the IMS VOIP, so as to determine how to perform the domain selection.

The method for implementing the domain selection during the terminated call in the related art will be described hereinafter in connection with FIG. 2 by taking a circumstance that the UE performs the attach/update at the SGSN in the 2G/3G network at first and then moves to the EPS network to perform update at the MME as an example. The method and flow that the UE performs the attach/update at the MME in the EPS network at first and then moves to the 2G/3G network to perform update at the SGSN is similar to the above method. FIG. 2 is a schematic flowchart of a method for implementing domain selection during a terminated call in the related art, and the method comprises the steps as follows.

Assuming that a UE powers on or performs attaching by inserting an SIM card in it under an SGSN, or the UE moves to an area covered by the SGSN to update a routing area.

Steps 2A1 to 2A8 are a process of a related method that the SGSN notifies the HSS of the IMS VOIP capability of the network area (i.e., the routing area) currently being accessed by the UE during the attach/update process performed by the UE in the 2G/3G network.

Step 2A1, the UE performs the attach/routing area update in the 2G/3G network;

Step 2A2, user context does not exist in the SGSN; and the SGSN sends an update location message to the HSS, wherein the update location message carries an IMS VOIP indicator which indicates whether the network area in which the UE is currently located supports the IMS VOIP.

Step 2A3, the HSS interacts with the SGSN, so as to respond with an update location response and insert subscriber data.

Step 2A4, the SGSN sends an attach/routing area update accept message to the UE to complete the attach/update process.

When the UE moves to a new routing area, the following steps will be performed.

Step 2A5, the UE performs the routing area update, and sends a routing area update message to the SGSN.

Step 2A6, the SGSN receives the routing area update message. At this time, the SGSN needs to judge whether the IMS VOIP capability of the area currently being accessed by the UE is changed. If the IMS VOIP capability of the routing area currently being accessed by the UE has changed, the SGSN needs to execute step 2A7 to notify the HSS that the IMS VOIP capability of the routing area currently being accessed by the UE is changed; otherwise, step 2A7 will not be executed.

Step 2A7, the SGSN sends a message to the HSS to notify the HSS of the IMS VOIP capability of the routing area currently being accessed by the UE.

Step 2A8, the SGSN sends a routing area update accept message to the UE.

Steps 2B1 to 2B9 are a process of the related method that the MME notifies the IMS VOIP capability of the network area (i.e., a tracking area list) being accessed by the UE currently to the HSS during the update process performed by the UE in the EPS network.

The UE moves to the EPS network access.

Step 2B1, the UE initiates a tracking area update process, and sends a tracking area update message to the MME.

Step 2B2, the MME finds the SGSN where the UE originally registered according to the information carried in the message sent by the UE, and obtains the UE context from the SGSN. In the process, the MME may activate an idle mode signaling redundancy (ISR) function; and an ISR correlation is established between the SGSN and the MME.

Step 2B3, since user context does not exist in the MME, the MME sends an update location message to the HSS, wherein the message carries the IMS VOIP capability of the network area accessed by the UE currently.

Step 2B4, subscriber data insertion and an update location response process are performed between the HSS and the MME.

Step 2B5, the MME sends a tracking area update accept message to the UE.

The UE moves into a tracking area which is not in the registered tracking area list. Since the tracking area is not updated, the UE initiates the tracking area update.

Step 2B6, the UE sends a tracking area update message to the MME.

Step 2B7, the MME judges whether the IMS VOIP capability of the network area currently being accessed by the UE is changed, wherein if the IMS VOIP capability is changed, the MME needs to execute step 2B8; otherwise, the step 2B8 is unnecessary to execute.

Step 2B8, the MME sends a message to the HSS to notify the IMS VOIP capability of the network area where the UE is currently located to the HSS.

Step 2B9, the MME sends a tracking area update accept message to the UE.

Subsequently, the UE may move, power on or power off in the network to perform an attach/update process similar to the above attach/update process, which is very easily known by those skilled in the art and will not be redundantly described here. Then the process continues until the CSCF/AS receives a request that session is required for the UE and the domain selection needs to be performed. The following steps 2C1 to 2C4 are the process of the domain selection after a CSCF/AS receives a call session request.

Step 2C1, the CSCF/AS receives the terminated session request to the UE.

Step 2C2, the AS sends a query request message to the HSS, so as to query information such as the IMS VOIP capability of the network area recently accessed by the UE.

Step 2C3, the HSS returns a query response message to the AS, wherein the message carries the IMS VOIP capability of the network area recently accessed by the UE.

Step 2C4, the AS performs the domain selection during the terminated call according to the information provided by the HSS.

After the above-mentioned method for selecting the domain during the terminated call is introduced, under the circumstance that the UE has already registered in the SGSN and the MME, when the IMS VOIP capability of the routing area and the tracking area accessed by the UE changes, the SGSN and the MME are also required to send signalings to the HSS, incurring the signaling loads between the SGSN/MME and the HSS. In practical applications, most users may move in the network; and the moving area includes different routing areas and tracking areas which support the IMS VOIP capability. However, the users may rarely receive calls, and thus during the calls the CSCF/AS needs to send the calls to the UE and the AS needs to perform the domain selection during the terminated calls. Therefore, comparing with the improvement on the accuracy of the domain selection brought by using the technology, the newly added signalings between the SGSN/MME and the HSS result in that the advantageous effects brought by the technology are extraordinary limited.

Assuming that a network is deployed as shown in FIG. 3 and the network area has a traffic vehicle (e.g. subway) which can simultaneously carry a large number of users, and assuming that the method in the above related art is applied in this case, during morning and evening rush hours everyday, since a large number of users move from one place to another place, even though few users have incoming calls, a great deal of signalings still exist between the MME/SGSN and the HSS in order to carry out the domain selection during the terminated calls in the related art, which will bring certain risks to the stable operation of the network, and may also affect the users to complete some services. In order to completely avoid the above situation, various requirements and limitations are put forward to the network deployment.

When the method for selecting the domain during the terminated call in the related art is applied under the circumstance that the ISR is activated, the situation becomes more complicated. The ISR is a function supported by the 3GPP (3rd Generation Partnership Project) for the purpose of reducing the network signaling loads brought by when the UE is in the idle state and in an area covered by both the 2G/3G network and the EPS network, the UE repeatedly selecting the 2G/3G network and the EPS network and initiating registrations. The main concept is that: when the UE registers in both the SGSN and the MME at the same time, both the SGSN and the MME save the context information of the user, and registration information of the two networks is also saved in the UE, in this way, the UE will not perform TAU (Tracking Area Update) or RAU(Routing Area Update) processes any more when later the UE needs to select between the two networks, unless the routing area in which the UE is currently located is not registered or the tracking area in which the UE is currently located is not in the registered tracking area list. Under the circumstance that the ISR is activated, since the UE does not initiate the update when the system accessed by the UE changes, the network can not know which access system the UE is currently in when the UE is in the idle state.

The above area with the ISR function and being covered by both the 2G/3G network and the EPS is also called an ISR area. During the network deployment, the ISR area may be the same as the area which supports the IMS VOIP, and may be different from the area which supports the IMS VOIP. If the ISR is the same as the area which supports the IMS VOIP, the method is the same as the method shown in FIG. 2; and if the ISR is different from the area which supports the IMS VOIP, the method has some other requirements on the basis of the method shown in FIG. 2.

For example, as shown in FIG. 4, an overlapped coverage area of the EPS network and the 2G/3G network supports the ISR function (i.e., the ISR area); but in the ISR area, the UE supports the IMS VOIP by access through the EPS network, and the UE does not support the IMS VOIP by access through the 2G/3G network or not all the 2G/3G areas support the IMS VOIP. Assuming that the UE performs the attach/update through RA1 access which does not support the IMS VOIP, during the update process, the SGSN notifies the HSS that the IMS VOIP is not supported; then the UE moves to the EPS access and performs the TAU process. Assuming that the ISR is activated during the update process, the UE may move back to the RA1 later and does not initiate the update process, and the terminated call is required to be performed through the CS domain when the UE accesses through the RA1 of the 2G/3G network. Therefore, the method for selecting the domain during the terminated call in the related art requires that the MME not only reports the IMS VOIP capability of the EPS network area being accessed by the UE currently, but also indicates the HSS not to select the domain depending on a current IMS VOIP indicator under the circumstance that the ISR is activated, wherein the specific indicating mode can be implemented in various methods. Therefore the MME/SGSN is required not only to send a message to the HSS to indicate the IMS VOIP capability when the IMS VOIP capability of the network area currently being accessed by the UE changes, but also to interact with the HSS and send related information to the HSS each time when the ISR transforms between an active state and an inactive state or each time when ISR is activated. All these requirements aggravate the signaling loads of the network and the processing complexity of the system.

Under the circumstance that a 2G/3G common routing area exists in the network deployment, when the UE which is in the idle state changes between the 2G RAT (radio access technology) and 3G RAT in the common routing area, the routing area update will not be initiated according to the prior art. Therefore, the method for selecting the domain during the terminated call in the related art has, when the method is applied under this circumstance, the problems similar to those when the ISR is activated.

SUMMARY OF THE INVENTION

The present invention mainly aims to provide a method and a system for implementing domain selection during a terminated call to at least solve the above-mentioned problem.

A method for implementing domain selection during a terminated call is provided according to one aspect of the present invention; the method comprises: an application server (AS) sending a query request message to a home subscriber server (HSS); the HSS querying a packet switching (PS) domain mobility management network element to obtain information of a called terminal and/or a network accessed by the called terminal; the HSS feeding back the obtained information of the called terminal and/or the network accessed by the called terminal to the AS; and the AS selecting a domain to which a call message is to be routed according to the information of the called terminal and/or the network accessed by the called terminal.

Preferably, the PS domain mobility management network element comprises: an MME and/or a SGSN, wherein the step of the HSS querying, according to the query request message, the PS domain mobility management network element to obtain the information of the called terminal and/or the network accessed by the called terminal in a call request message comprises: the HSS receiving the query request message; the HSS sending, according to information of the MME and/or information of the SGSN of the called terminal recorded in the HSS, the query request message to the MME and/or the SGSN; when the MME receives the query request message, the MME returning the information of the called terminal and/or the network accessed by the called terminal to the HSS; and when the SGSN receives the query request message, the SGSN returning the information of the called terminal and/or the network accessed by the called terminal to the HSS.

Preferably, the step of the HSS feeding back the obtained information of the called terminal and/or the network accessed by the called terminal to the AS comprises: the HSS receiving the information of the called terminal and/or the network accessed by the called terminal from the MME and the SGSN; the HSS obtaining, according to the received information of the called terminal and/or the network accessed by the called terminal sent by the MME and the SGSN, the information or a combination of the information sent by the MME or the SGSN which is accessed and/or updated by the called terminal lastly; and the HSS feeding back the information or the combination of the information to the AS.

Preferably, the information of the network accessed by the called terminal comprises: IMS VOIP capability of a network area in which the called terminal currently registers.

Preferably, the information of the called terminal comprises at least one of the following: registration time of the called terminal, last time when the called terminal interacted with the network, a radio access technology (RAT) used for access by the called terminal last time, whether idle mode signaling redundancy (ISR) being activated, state information indicating whether the called terminal is currently in a connecting state, and an RAT used by the called terminal when last time the called terminal accessed a 2G/3G common routing area.

Preferably, the information of the network accessed by the called terminal also comprises: an indicator of the 2G/3G common routing area of a routing area in which the called terminal registers currently.

Preferably, the MME and the SGSN may be independent network elements or a combined (combo) node, wherein the combo node is a combined MME/SGSN.

When the combo node receives the query request message from the HSS and in the combo node, and a user equipment (UE) currently has performed tracing area (TA) and routing area (RA) registrations at the same time, the combo node returns the information of the called terminal to the HSS by a response message.

Preferably, the step of the AS selecting the domain to which the call request message is to be routed according to the information of the called terminal and/or the network accessed by the called terminal comprises: when the AS acquires that the called terminal is in the connecting state under the MME and the network area currently being accessed by the terminal supports the IMS VOIP, the AS selecting the domain currently being accessed by the terminal to perform the terminated call; or when the AS acquires that the terminal is in the connecting state under the SGSN and the network area currently being accessed by the terminal and the RAT support the IMS VOIP, the AS selecting the domain currently being accessed by the terminal to perform the terminated call.

Preferably, the step of the AS selecting the domain to which the call request message is to be routed according to the information of the called terminal and/or the network accessed by the called terminal comprises: when the AS acquires that the terminal is in an idle state currently with the ISR being activated and an evolved packet system (EPS) network area in which the terminal currently registers supports the IMS VOIP while a 2G/3G network area does not support the IMS VOIP, the AS performing the terminated call by both a PS access mode and a 2G/3G CS mode in parallel.

Preferably, the step of the AS selecting the domain to which the call message is to be routed according to the information of the called terminal and/or the network accessed by the called terminal comprises at least one of the followings: when the AS acquires that the ISR is not activated, the network area in which the called terminal registered last time is a tracking area which supports the IMS VOIP, the AS performing the routing through an EPS; when the AS acquires that the ISR is not activated and the network area in which the called terminal registered last time is a tracking area which does not support the IMS VOW, the AS performing the routing through the EPS or a CS domain of 2G/3G, or through the EPS and CS domains of the 2G/3G at the same time; when the AS acquires that the ISR is not activated and the network area in which the called terminal registered last time is a routing area which is not the 2G/3G common routing area and supports the IMS VOIP, the AS performing the routing through the PS domain of the 2G/3G; when the AS acquires that the ISR is not activated and the network area in which the called terminal registered last time is a routing area which is not the 2G/3G common routing area and does not support the IMS VOIP, the AS performing the routing through the CS domain of the 2G/3G; when the AS acquires that the ISR is not activated and the network area in which the called terminal registered last time is a routing area which is the 2G/3G common routing area and supports the IMS VOIP, the AS performing the routing through the PS domain of the 2G/3G or the CS domain of the 2G/3G, or through the PS domain and the CS domain of the 2G/3G at the same time; when the AS acquires that the ISR is not activated and the network area in which the called terminal registered last time is a routing area which is the 2G/3G common routing area and does not support the IMS VOIP, the AS performing the routing through the CS domain of the 2G/3G; when the AS acquires that the ISR is activated, all the network areas in which the called terminal currently registers supports the IMS VOIP, and a routing area in which the called terminal currently registers is not the 2G/3G common routing area, the AS performing the routing through the PS domain; when the AS acquires that the ISR is activated, all the network areas in which the called terminal currently registers support the IMS VOIP, and a routing area in which the called terminal currently registers is the 2G/3G common routing area, the AS performing the routing through the PS domain, or through the PS domain and the CS domain at the same time; when the AS acquires that the ISR is activated, all the network areas in which the called terminal currently registers support the IMS VOIP, and a routing area in which the called terminal currently registers is the 2G/3G common routing area, the AS performing further judgment according to the state information of the called terminal, wherein when the called terminal is in the connecting state under the MME, the AS selects the PS domain to perform the routing; when the called terminal is in the connecting state under the SGSN and the RAT currently used is the 2G, the AS selects a CS domain to perform the routing; when the called terminal is in the connecting state under the SGSN and a RAT currently used is the 3G, the AS selects the PS domain to perform the routing; and when the called terminal is in the idle state, the AS selects the PS domain, or the PS domain and the CS domain at the same time to perform the routing; when the AS acquires that the ISR is activated and none of the network areas in which the called terminal currently registers supports the IMS VOIP, the AS performing the routing through the CS domain of the 2G/3G; when the AS acquires that the ISR is activated, the tracking area in which the called terminal currently registers supports the IMS VOIP, the routing area in which the called terminal currently registers does not support the IMS VOIP, and the called terminal is currently in the idle state, the AS performing the routing through the PS domain or the CS domain, or through the PS domain and the CS domain at the same time; when the AS acquires that the ISR is activated, the tracking area in which the called terminal currently registers supports the IMS VOIP, the routing area in which the called terminal currently registers does not support the IMS VOIP, and the called terminal is currently in the connecting state under the MME, the AS performing the routing through the PS domain; when the AS acquires that the ISR is activated, the tracking area in which the called terminal currently registers supports the IMS VOIP, the routing area in which the called terminal currently registers does not support the IMS VOW, and the called terminal is currently in the connecting state under the SGSN, the AS performing the routing through the CS domain of the 2G/3G; when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the idle state, the AS performing the routing through the PS domain or the CS domain, or through the PS domain and the CS domain at the same time; when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the connecting state under the MME, the AS performing the routing through the PS domain, or through the PS domain and the CS domain at the same time; when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the connecting state under the SGSN, the AS performing the routing through the PS domain; when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, and the called terminal is currently in the idle state, the AS performing the routing through the PS domain or the CS domain, or through the PS domain and the CS domain at the same time; when the AS realizes that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, and the called terminal is currently in the connecting state under the MME, the AS performing the routing through the PS domain, or through the PS domain and the CS domain at the same time; when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, the called terminal is currently in the connecting state under the SGSN, and the called terminal accesses the network by the 3G currently, the AS performing the routing through the PS domain; when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, the called terminal is currently in the connecting state under the SGSN, and the called terminal accesses the network by the 2G currently, the AS performing the routing through the CS domain, or through the CS domain and the PS domain at the same time.

Preferably, the above method also comprises: when the terminal moves from one routing area to another routing area and sends a routing area update message to the SGSN to update the routing area, the SGSN updating location information of the terminal saved in the SGSN according to the received routing area update message, and sending a routing area update accept message to the terminal.

Preferably, the above method also comprises: when the terminal moves into a tracking area in the EPS network which is not in the registered tracking area list and sends a tracking area update message to the MME to update the tracking area, the MME updating location information of the terminal saved in the MME according to the received tracking area update message, and sending a tracking area update accept message to the terminal.

A system for implementing domain selection during a terminated call is provided according to another aspect of the present invention; and the system comprises: an application server (AS), configured to send a query request message to a home subscriber server (HSS) and to select a domain to which a call message is to be routed according to information of a called terminal and/or a network accessed by the called terminal fed back by the HSS; the HSS, configured to query a packet switching (PS) domain mobility management network element to obtain the information of the called terminal and/or the network accessed by the called terminal in the call request message, and to feed back the obtained information of the called terminal and/or the network accessed by the called terminal to the AS; and the PS domain mobility management network element.

Preferably, the PS domain mobility management network element is an MME and/or an SGSN; the HSS comprises: a first receiving module, configured to receive the query request message; and a first sending module, configured to send, according to the information of the MME and/or the information of the SGSN of the called terminal recorded in the HSS, the query request message to the MME and/or the SGSN; the MME, configured to return the information of the called terminal and/or the network accessed by the called terminal to the HSS when receiving the query request message; and the SGSN, configured to return the information of the called terminal and/or the network accessed by the called terminal to the HSS when receiving the query request message.

Preferably, the information of the network accessed by the called terminal comprises: IMS VOIP capability of a network area in which the called terminal registers currently; the information of the called terminal comprises at least one of the following: registration time of the called terminal, last time when the called terminal interacted with a network, a radio access technology (RAT) used for access by the called terminal last time, whether idle mode signaling redundancy (ISR) being activated, state information indicating whether the called terminal is currently in a connecting state, and a radio access technology (RAT) used when last time the called terminal accessed a 2G/3G common routing area; and the information of the network accessed by the called terminal further comprises: an indicator of a 2G/3G common routing area of a routing area in which the called terminal registers currently.

Preferably, when the terminal moves from one routing area to another routing area and sends a routing area update message to the SGSN to update the routing area, the SGSN comprises: a second receiving module, configured to receive the routing area update message from the terminal; a first updating module, configured to update location information of the terminal according to the routing area update message; and a second sending module, configured to send a routing area update accept message to the terminal.

Preferably, when the terminal moves into a tracking area in the EPS network which is not in the registered tracking area list and sends a tracking area update message to the MME to update the tracking area, the MME comprises: a third receiving module, configured to receive the tracking area update message from the terminal; a second updating module, configured to update the location information of the terminal according to the tracking area update message; and a third sending module, configured to send a tracking area update accept message to the terminal.

In virtue of the present invention, during the terminated call, when the AS receives the call request and selects the domain, the HSS queries the PS domain mobility management network element to obtain the IMS VOIP capability of the network area in which the called terminal currently registers after the HSS receives the query message from the AS. After the PS domain mobility management network element intercommunicates with the HSS to complete the location update process, the UE is free from sending related information to the HSS at each time the IMS VOIP capability of the network area to which the UE currently accesses changes. Therefore, the present invention solves the problem that the signaling loads between the SGSN/MME and the HSS is comparatively greatly generated by the requirement that the SGSN and the MME are also required to send a message to the HSS to transfer the information of the latest VOIP capability etc. to the HSS in the related art when the IMS VOIP capability of the routing area and tracking area to which the UE accesses change, can greatly reduce the number of the signalings between the PS domain mobility management network element and the HSS, avoids various limitations of the signaling loads generated by the HSS on network deployment, is convenient for the network deployment, and ensures the implementation of services.

DETAILED DESCRIPTION OF THE EMBODIMENTS

The present invention will be described in detail hereinafter with reference to the drawings and in connection with the embodiments. What should be explained is that if there is no conflict, the embodiments of the present invention and the features in the embodiments can be combined with each other.

Figure 1:
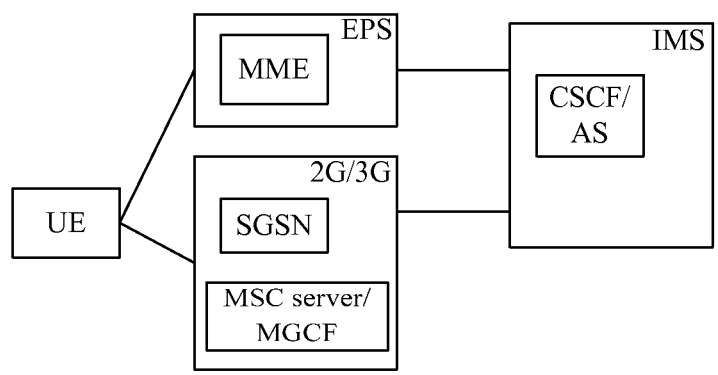
FIG. 1 is a schematic diagram of a mode that a UE accesses an IMS network to implement services according to the related art.
Figure 2:
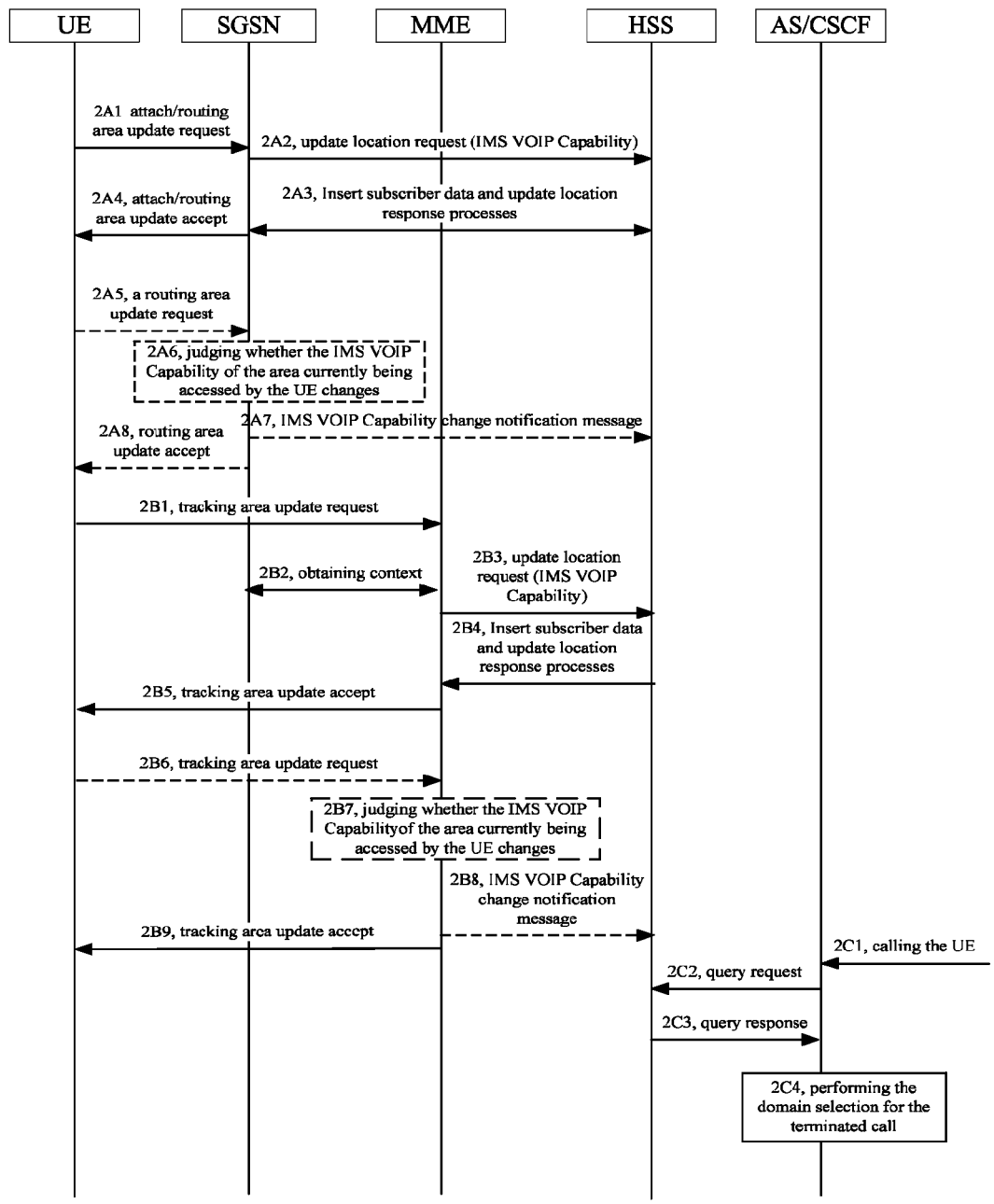
FIG. 2 is a schematic flowchart of a method for implementing domain selection during a terminated call in the related art.
Figure 3:
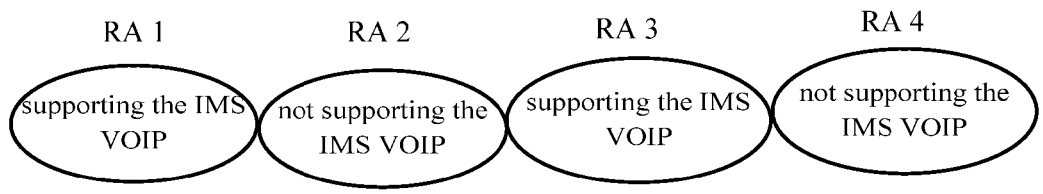
FIG. 3 is a schematic diagram of a possible network deployment scene and the IMS VOIP capability supported by the network in the related art.
Figure 4:
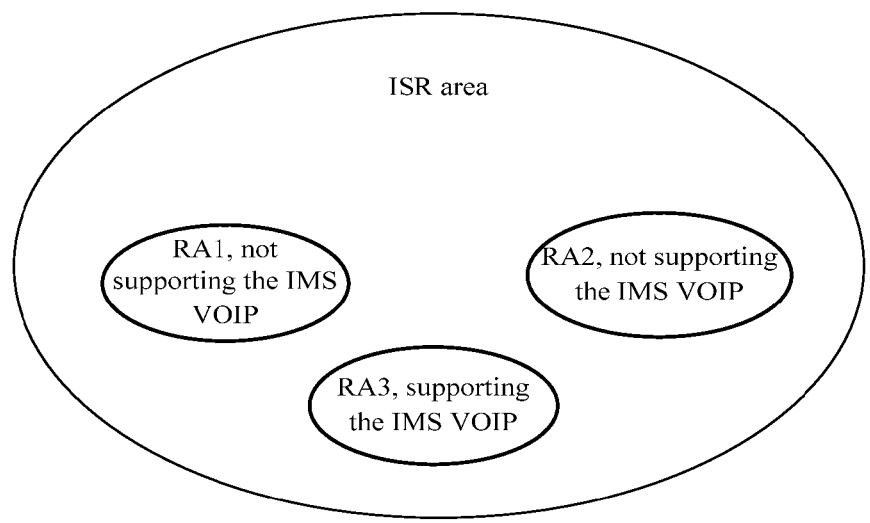
FIG. 4 is a schematic diagram of a network deployment scene that an ISR area is different from an IMS VOIP area in the related art.
Figure 5:
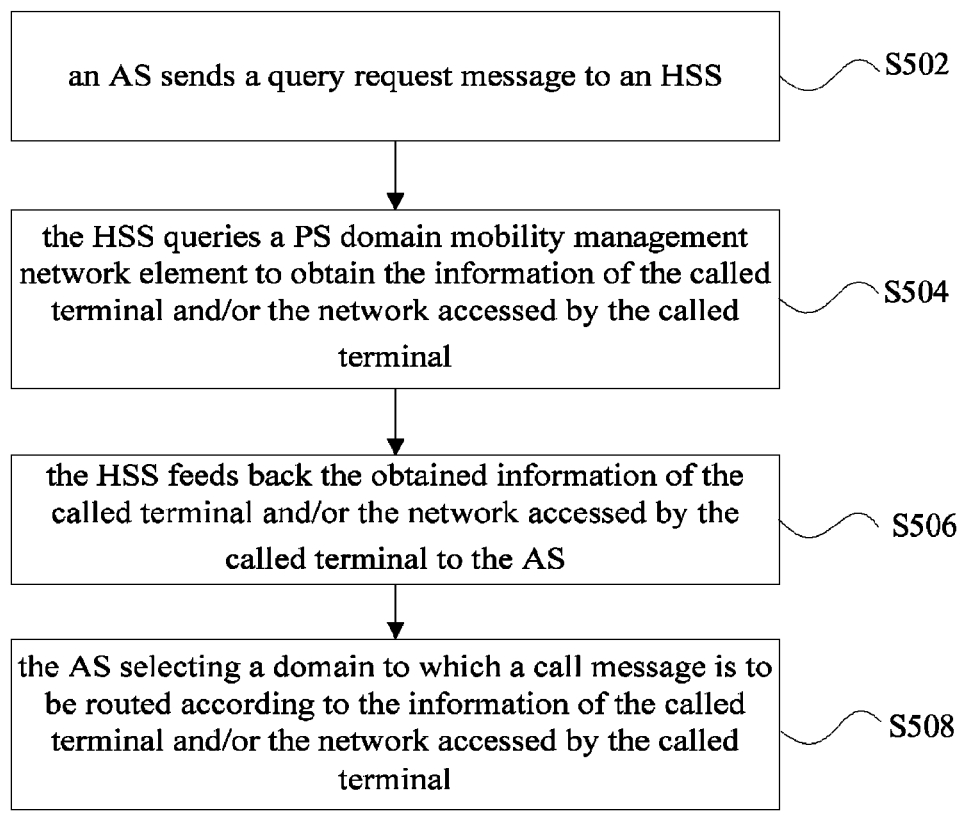
FIG. 5 is a schematic diagram of a method for implementing domain selection during a terminated call according to the embodiments of the present invention.

FIG. 5 is a schematic diagram of a method for implementing domain selection during a terminated call according to the embodiments of the present invention; and the method comprises the following steps.

Step S502, an application server (AS) sends a query request message to a home subscriber server (HSS).

Step S504, the HSS queries a packet switching (PS) domain mobility management network element to obtain information of a called terminal and/or a network accessed by the called terminal in a call request message.

Step S506, the HSS feeds back the obtained information of the called terminal and/or the network accessed by the called terminal to the AS.

Step S508, the AS selects a domain to which the call request message is to be routed according to the information of the called terminal and/or the network accessed by the called terminal.

Preferably, in the step S502, the AS sends the query request message to the HSS according to a received call request message.

Preferably, in the step S504, the HSS queries, according to the received query request message, the PS domain mobility management network element to obtain the information of the called terminal and/or the network accessed by the called terminal in the call request message.

In the embodiment, during the terminal call, when the AS receives the call request and selects the domain, the HSS queries the PS domain mobility management network element to obtain the IMS VOIP capability of the network area in which the called terminal currently registers after the HSS receives the query request message from the AS. After the PS domain mobility management network element has interacted with the HSS and completed the location update process, the PS domain mobility management network element is free from sending the related information to the HSS each time when the IMS VOIP capability of the network area to which the UE currently accesses changes. Therefore, the present invention solves the problem that the signaling loads between the SGSN/MME and the HSS is comparatively greatly generated by the requirement that the SGSN and the MME are also required to send message to the HSS to convey the information of the latest VOIP capability etc. to the HSS in the related art when the IMS VOIP capability of the routing area and tracking area to which the UE accesses changes. Since users receive comparatively fewer calls, the embodiment of the present invention can greatly reduce the number of the signalings between the PS domain mobility management network element and the HSS, avoids various limitations of the signaling loads generated by the HSS on network deployment, is convenient for the network deployment, and ensures the implementation of services.

Preferably, the PS domain mobility management network element in the step S504 comprises an MME and/or an SGSN; and the step S504 comprises: the HSS receiving the query request message; the HSS sending, according to information of the MME and/or information of the SGSN of the called terminal recorded in the HSS, the query request message to the MME and/or the SGSN; when the MME receives the query request message, the MME returning the information of the called terminal and/or the network accessed by the called terminal to the HSS; and when the SGSN receives the query request message, the SGSN returning the information of the called terminal and/or the network accessed by the called terminal to the HSS. Further, the MME and the SGSN may be a combined MME/SGSN.

The preferable embodiment provides a detailed implementation of the HSS querying the PS domain mobility management network element to obtain the information of the called terminal and/or the network accessed by the called terminal in the call request message.

Preferably, the above information of the network accessed by the called terminal comprises: IMS VOIP capability of a network area in which the called terminal currently registers; and the above information of the called terminal comprises at least one of the followings: registration time of the called terminal, last time when the called terminal interacted with the network, radio access technology (RAT) used for access by the called terminal last time, whether idle mode signaling redundancy (ISR) being activated, state information indicating whether the called terminal is currently in a connecting state, and an RAT used by the called terminal when last time the called terminal accessed a routing area. The information of the network accessed by the called terminal may also comprise: an indicator of the 2G/3G common routing area of a routing area in which the called terminal currently registers.

During the detailed implementation, the indicator of the 2G/3G common routing area of a routing area in which the called terminal currently registers and the information of the RAT used by the called terminal when last time the called terminal accessed the routing area can be that: the routing area in which the called terminal currently registers provided by the SGSN is/is not the 2G/3G common routing area, and last time when the UE accessed (the UE in the idle state interacts with the SGSN last time, and/or the UE in the connecting state interacts with the SGSN currently) the routing area by using the 2G or the 3G under the circumstance that the routing area is the 2G/3G common routing area; or can be that: only under the circumstance that the routing area in which the called terminal currently registers is the 2G/3G common routing area, the SGSN indicates that the area is the 2G/3G common routing area and provides the information that the UE accessed the routing area last time by using the 2G or the 3G.

During the implementation, the information of the called terminal and/or the network accessed by the called terminal can be various combinations of a part or all of the above-mentioned information elements.

The MME/SGSN (the MME and/or the SGSN) can directly send the above-mentioned information elements to the HSS, or combine the information elements and send the combinations to the HSS. For the information elements received by the HSS from the MME/SGSN (the MME and/or the SGSN), the HSS can directly send the information elements to the AS, or combine the information elements and send the combinations to the AS, wherein the step that the HSS combines the information elements and sends the combinations to the AS comprises: after receiving the above information from both the MME and the SGSN, the HSS analyzes and compares the information, and only sends the AS the information elements or the various combinations of the information elements sent from the MME or the SGSN whichever the UE accessed and/or updated last time.

In this case, the step S508 comprises: when the AS acquires that the terminal is in the connecting state under the MME and the network area currently being accessed by the terminal supports the IMS VOIP, the AS selecting the domain currently being accessed by the terminal to perform the terminated call; or when the AS acquires that the terminal is in the connecting state under the SGSN and the network area currently being accessed by the terminal and the RAT support the IMS VOIP, the AS selecting the domain currently being accessed by the terminal to perform the terminated call. In this way, when the information is obtained from the MME/SGSN through the HSS, the AS can select the domain currently being accessed by the UE in priority to perform the terminated call according to the above-mentioned information, thereby improving the accuracy of the domain selection, reducing the possibility of failure in the domain selection compared with the related art, and increasing the speed of the terminated call.

The step S508 also comprises: when the AS acquires that the terminal is currently in an idle state with the ISR being activated and an evolved packet system (EPS) network area in which the terminal currently registers supports the IMS VOIP while the 2G/3G network area does not support the IMS VOW, the AS performing the terminated call by both a PS access mode and a 2G/3G CS mode in parallel. In this way, when the AS obtains the information through the above-mentioned mode, the AS can also determine to perform the terminated call through the PS access mode and the CS mode of the 2G/3G in parallel, with the result being that the process of trying different domains in serial is changed into trying different domain in parallel, and the speed of establishing the terminated call is effectively improved.

The step S508 also comprises:

when the AS acquires that the ISR is not activated, the network area in which the called terminal last time registered is a tracking area which supports the IMS VOIP, the AS performing the routing through the EPS; or when the AS acquires that the ISR is not activated and the network area in which the called terminal last time registered is a tracking area which does not support the IMS VOIP, the AS performing the routing through the EPS or the CS domain of 2G/3G, or through the EPS domain and the CS domains of the 2G/3G at the same time; or when the AS acquires that the ISR is not activated and the network area in which the called terminal last time registered is a routing area which is not the 2G/3G common routing area and supports the IMS VOIP, the AS performing the routing through the PS domain of the 2G/3G; or when the AS acquires that the ISR is not activated and the network area in which the called terminal last time registered is a routing area which is not the 2G/3G common routing area and does not support the IMS VOIP, the AS performing the routing through the CS domain of the 2G/3G; or when the AS acquires that the ISR is not activated and the network area in which the called terminal last time registered is a routing area which is the 2G/3G common routing area and supports the IMS VOIP, the AS performing the routing through the PS domain of the 2G/3G or the CS domain of the 2G/3G, or through the PS domain and the CS domain of the 2G/3G at the same time; or when the AS acquires that the ISR is not activated and the network area in which the called terminal last time registered is a routing area which is the 2G/3G common routing area and does not support the IMS VOIP, the AS performing the routing through the CS domain of the 2G/3G; or when the AS acquires that the ISR is activated, all the network areas in which the called terminal currently registers support the IMS VOIP, and a routing area in which the called terminal currently registers is not the 2G/3G common routing area, the AS performing the routing through the PS domain; or when the AS acquires that the ISR is activated, all the network areas in which the called terminal currently registers support the IMS VOIP, and a routing area in which the called terminal currently registers is the 2G/3G common routing area, the AS performing the routing through the PS domain, or through the PS domain and the CS domain at the same time;

when the AS acquires that the ISR is activated, all the network areas in which the called terminal currently registers support the IMS VOIP, and a routing area in which the called terminal currently registers is the 2G/3G common routing area, the AS performing further judgment according to the state information of the called terminal, wherein when the called terminal is in the connecting state under the MME, the AS selects the PS domain to perform the routing; when the called terminal is in the connecting state under the SGSN and the RAT currently used is the 2G, the AS selects a CS domain to perform the routing; when the called terminal is in the connecting state under the SGSN and a RAT currently used is the 3G, the AS selects the PS domain to perform the routing; and when the called terminal is in the idle state, the AS selects the PS domain, or the PS domain and the CS domain at the same time to perform the routing; or when the AS acquires that the ISR is activated and none of the network areas in which the called terminal currently registers supports the IMS VOIP, the AS performing the routing through the CS domain of the 2G/3G; or when the AS acquires that the ISR is activated, the tracking area in which the called terminal currently registers supports the IMS VOIP, the routing area in which the called terminal currently registers does not support the IMS VOIP, and the called terminal is currently in the idle state, the AS performing the routing through the PS domain or the CS domain, or through the PS domain and the CS domain at the same time; or when the AS acquires that the ISR is activated, the tracking area in which the called terminal currently registers supports the IMS VOIP, the routing area in which the called terminal currently registers does not support the IMS VOIP, and the called terminal is currently in the connecting state under the MME, the AS performing the routing through the PS domain; or when the AS acquires that the ISR is activated, the tracking area in which the called terminal currently registers supports the IMS VOIP, the routing area in which the called terminal currently registers does not support the IMS VOIP, and the called terminal is currently in the connecting state under the SGSN, the AS performing the routing through the CS domain of the 2G/3G; or when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the idle state, the AS performing the routing through the PS domain or the CS domain, or through the PS domain and the CS domain at the same time; or when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the connecting state under the MME, the AS performing the routing through the PS domain, or through the PS domain and the CS domain at the same time; or when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the connecting state under the SGSN, the AS performing the routing through the PS domain; or when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, and the called terminal is currently in the idle state, the AS performing the routing through the PS domain or the CS domain, or through the PS domain and the CS domain at the same time; or when the AS realizes that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, and the called terminal is currently in the connecting state under the MME, the AS performing the routing through the PS domain, or through the PS domain and the CS domain at the same time; or when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, the called terminal is currently in the connecting state under the SGSN, and the called terminal accesses the network by the 3G currently, the AS performing the routing through the PS domain; or when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, the called terminal is currently in the connecting state under the SGSN, and the called terminal accesses the network by the 2G currently, the AS performing the routing through the CS domain, or through the CS domain and the PS domain at the same time.

The above preferable embodiment provides a detailed implementation that the AS performs the domain selection during the terminated call according to the information of the called terminal and/or the network accessed by the called terminal.

Preferably, the method also comprises: when the terminal moves from one routing area to another routing area and sends a routing area update message to the SGSN to update the routing area, the SGSN updating location information of the terminal saved in the SGSN according to the received routing area update message, and sending a routing area update accept message to the terminal.

The preferable embodiment provides a detailed implementation that when the terminal has registered in a SGSN, and later the UE updates the location information of the terminal for the SGSN in the network area administered by the SGSN because the routing area of the UE changes. In this case, the SGSN is free from judging whether the IMS VOIP capability of the network area currently accesses by the UE changes and from notifying the HSS when the judgment result shows a change happens.

Preferably, the method also comprises: when the terminal moves into a tracking area in the EPS network which is not in the registered tracking area list and sends a tracking area update message to the MME to update the tracking area, the MME updating location information of the terminal saved in the MME according to the received tracking area update message, and sending a tracking area update accept message to the terminal.

Preferably, the MME and the SGSN can be independent network elements or a combined (combo) node, wherein the combo node is a combined MME/SGSN.

When the combo node receives the query request message from the HSS and in the combo node, the UE currently performs tracing area (TA) and routing area (RA) registrations at the same time, the combo node returns the information of the called terminal and/or the network accessed by the called terminal to the HSS by a response message.

The preferable embodiment provides a detailed implementation that when the terminal has registered in a MME, and later the UE updates the location information of the terminal for the MME in the network area administered by the MME because the tracking area changes. Similarly, in this case the MME is free from judging whether the IMS VOIP capability of the network area currently being accessed by the UE changes and notifying the HSS when the judgment result shows a change happens.

Compared with the related art, after the MME/SGSN interacts with the HSS to carry out the location update process, the method of the present invention does not require the MME/SGSN to send related information to the HSS when the IMS VOIP capability of the network area currently being accessed by the UE changes. Therefore, the present invention can greatly reduce the number of the signalings between the PS domain mobility management network element and the HSS, avoids various limitations of the signaling loads generated by the HSS on the network deployment, and thus is convenient for the network deployment and ensures the implementation of services.

Preferable Embodiment 1

Figure 6:
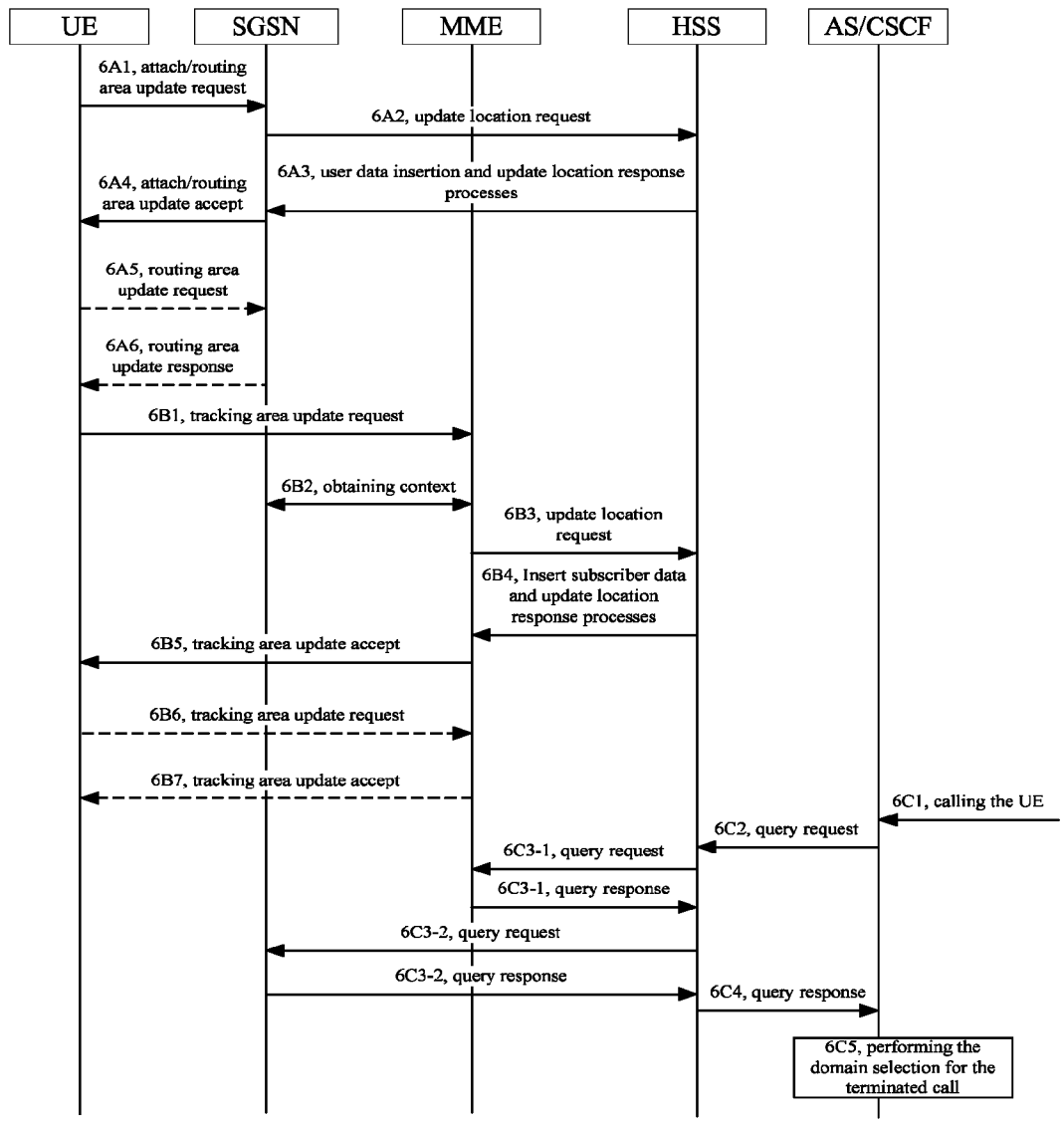
FIG. 6 is a flowchart of a method for implementing domain selection during a terminated call according to Preferable Embodiment 1 of the present invention.

FIG. 6 is a flowchart of a method for implementing domain selection during a terminated call according to Preferable Embodiment 1 of the present invention. As shown in FIG. 6, the method comprises the following steps.

Assuming that a UE powers on or performs attach by inserting an SIM card under an SGSN, or the UE moves to an area covered by the SGSN to update the routing area.

Steps 6A1-6A6 are a process that the UE performs attach/update in a 2G/3G network.

Step 6A1, the UE performs the attach/routing area update in the 2G/3G network.

Step 6A2, user context does not exist in the SGSN; and the SGSN sends an update location message to an HSS.

Step 6A3, the HSS interacts with the SGSN, so as to return an update location response and insert subscriber data.

Step 6A4, the SGSN sends an attach/routing area update accept message to the UE to complete the attach/update process.

When the UE moves to a new routing area, the following steps will be performed.

Step 6A5, the UE performs the routing area update process, and sends a routing area update message to the SGSN.

Step 6A6, the SGSN receives the routing area update message, updates corresponding location information, and sends a routing area update accept message to the UE.

Steps 6B1-6B7 are a process that the UE performs update in an EPS network.

The UE moves to the EPS network access.

Step 6B1, the UE initiates a tracking area update process, and sends a tracking area update message to an MME.

Step 6B2, the MME finds the SGSN where the UE originally registered according to the information carried in the message sent by the UE, and obtains the UE context from the SGSN. In the process, the MME may activate an ISR function; and an ISR correlation is established between the SGSN and the MME.

Step 6B3, since user context does not exist in the MME, the MME sends an update location message to the HSS.

Step 6B4, insert subscriber data and an update location response process are performed between the HSS and the MME.

Step 6B5, the MME sends a tracking area update accept message to the UE.

The UE moves into a tracking area which is not in the registered tracking area list. Since the tracking area has not been updated, the UE initiates the tracking area update.

Step 6B6, the UE sends a tracking area update message to the MME.

Step 6B7, the MME updates current location information of the UE, and sends a tracking area update accept message to the UE.

Subsequently, the UE may move, power on and power off in the network to perform a flow which is similar to the above-mentioned attach/update flow, which is very easy for those skilled in the art to know, so unnecessary details will not be repeated here any more until a CSCF/AS receives a request for calling the UE and the domain selection is required. The following Steps 6C1-6C5 are a process that the CSCF/AS receives an incoming call request to perform a domain selection during the terminated call according to the method of the present invention.

Step 6C1, the CSCF/AS receives the request for calling the UE.

Step 6C2, the AS sends a query request message to the HSS, so as to query information such as the IMS VOIP capability of the network area in which the UE has already registered.

Step 6C3-1 and step 6C3-2 can be executed in parallel or be executed according to precedence order. The HSS can send the query message to both the MME and the SGSN, and can also send the query message to either of the MME and the SGSN.

Step 6C3-1, the HSS sends the query request message to the MME according to MME information recorded in the HSS; and when the MME receives the query request message, the MME returns the information such as the IMS VOIP capability of the network area in which the UE currently registers to the HSS.

Step 6C3-2, the HSS sends the query request message to the SGSN according to the SGSN information recorded in the HSS; and when the SGSN receives the query request message, the SGSN returns the information such as the IMS VOIP capability of the network area in which the UE currently registers to the HSS.

Step 6C4, the HSS feeds back the above information obtained from the MME/SGSN to the AS at the request of the AS.

Step 6C5, the AS perform the domain selection during the terminated call according to the information provided by the HSS.

It is to be noted that the method of the present invention not only can be applied under the circumstance that the MME and the SGSN are independent network elements as shown in FIG. 6, but also can be applied in the case of the combo node.

Preferable Embodiment 2

Figure 7:
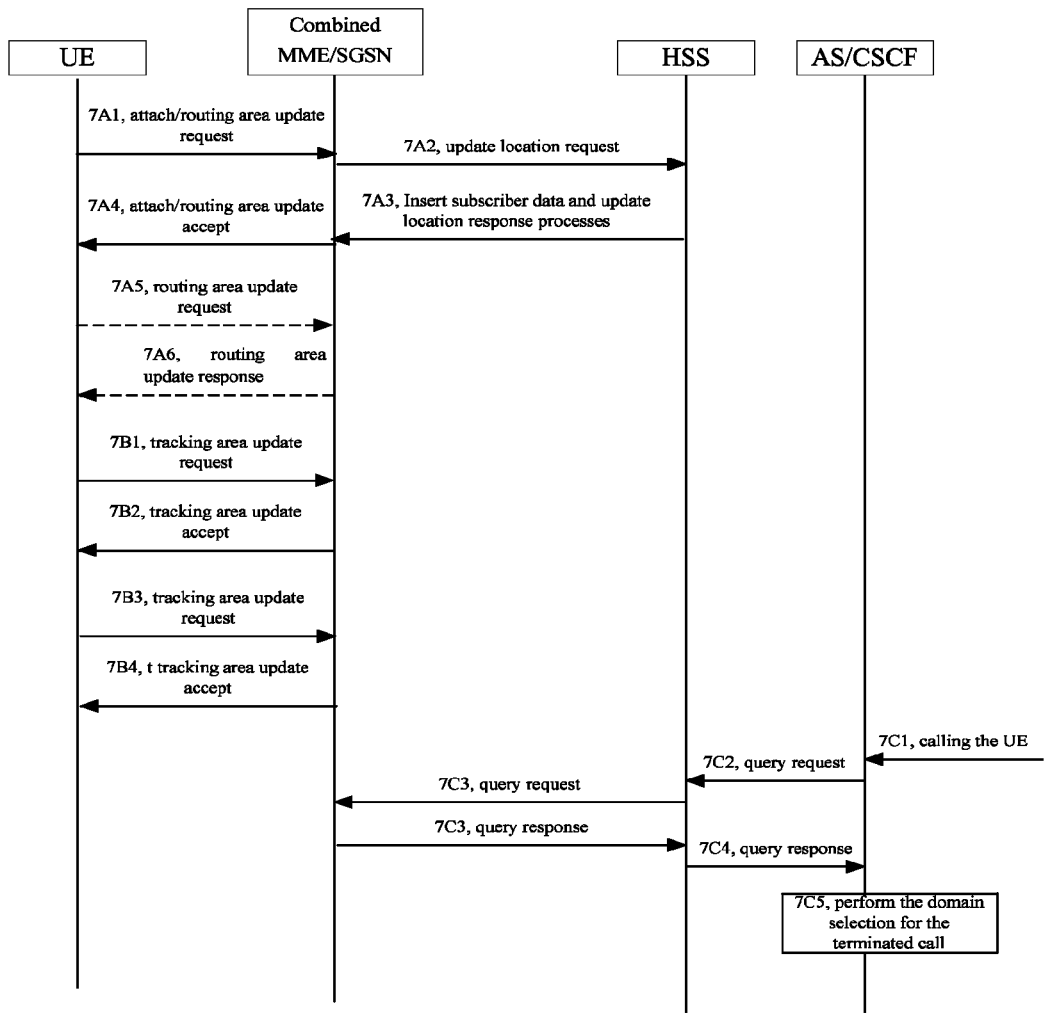
FIG. 7 is a schematic flowchart of a method for implementing domain selection during a terminated call under a combined MME/SGSN scene according to Preferable Embodiment 2 of the present invention.

FIG. 7 is a flowchart of a method for implementing domain selection during a terminated call under a combined MME/SGSN scene according to Preferable Embodiment 2 of the present invention. The scene is a circumstance that a UE accesses a same combined MME/SGSN in both a 2G/3G network and an EPS network. As shown in FIG. 7, the method comprises the steps as follows.

Assuming that the UE powers on or performs the attach by inserting an SIM card under the 2G/3G network in the combined MME/SGSN, or the UE moves to an area covered by the combined MME/SGSN to update a routing area.

The steps 7A1-7A6 are a process that the UE performs attach/update in the 2G/3G network.

Step 7A1, the UE performs the attach/routing area update in the 2G/3G network.

Step 7A2, user context does not exist in the combined MME/SGSN; and the SGSN of the combo node sends an update location message to an HSS, and indicates in the message that the node is the combo node.

Step 7A3, the HSS interacts with the combined MME/SGSN, so as to return an update location response and insert subscriber data.

Step 7A4, the combined MME/SGSN sends an attach/routing area update accept message to the UE, so as to complete the attach/update process.

When the UE moves to a new routing area, the following steps will be performed.

Step 7A5, the UE performs a routing area update process, and sends a routing area update message to the combined MME/SGSN.

Step 7A6, the combined MME/SGSN receives the routing area update message, performs the corresponding location update process, and sends a routing area update accept message to the UE.

Steps 7B1-7B4 are a process that the UE performs update in the EPS network.

The UE moves to the EPS network and accesses the EPS network; and it is assumed that the tracking area in which the UE is currently located is in the management range of the combined MME/SGSN which has performed the routing area update already.

Step 7B1, the UE initiates a tracking area update process. The tracking area update request message sent by the UE is routed to the combined MME/SGSN according to the related art.

Step 7B2, the combined MME/SGSN receives the tracking area update request message sent by the UE and processes it accordingly. In the process, the ISR may be activated. The combined MME/SGSN sends a tracking area update accept message to the UE. Since the combined MME/SGSN has performed the location update and insert subscriber data processes with the HSS, the combined MME/SGSN will not interact with the HSS any more.

The UE moves into a tracking area which is not in the registered tracking area list. Since the tracking area is not updated, the UE initiates the tracking area update. If the tracking area is still in the management range of the combined MME/SGSN, the flow is as shown in the Steps 7B3-7B4 which are the same with the process as shown in the Steps 7B1-7B2, so unnecessary details will not be repeated any more.

Subsequently, the UE may move, power on and power off in the network to perform the flow which is similar to the above-mentioned attach/update flow, which is very easy for those skilled in the art to know, so unnecessary details will not be repeated here any more until a CSCF/AS receives a request for calling the UE and the domain selection is required. The following Steps 7C1-7C5 are a process that the CSCF/AS receives an incoming call request and performs a domain selection during the terminated call according to the method of the present invention.

Step 7C1, the CSCF/AS receives a request for calling the UE.

Step 7C2, the AS sends a query request message to the HSS to query the information such as the IMS VOIP capability of the network area in which the UE has already registered.

Step 7C3, the HSS obtains combined MME/SGSN information according to the information recorded in the HSS, and sends the query request message to the combined MME/SGSN. The combined MME/SGSN receives the query request, and returns the IMS VOIP capability of the network area to which the UE currently registers to the HSS. Furthermore, the combined MME/SGSN can also feed back the information of the called terminal and/or the network accessed by the called terminal, such as whether the ISR is activated and state information that whether the UE is in the connecting state currently, to the HSS. The process comprises two circumstances as follows.

1) If the UE has not performed the tracking area update in the combined MME/SGSN, i.e., the steps 7B1-7B4 having not been executed, the combo node only returns the IMS VOIP capability of the RA area in which the UE currently registers to the HSS. Furthermore, the combo node can also feed back the information whether the UE is in the connecting state to the HSS, and notify the HSS of a RAT used when last time the UE in the idle state interacted with the SGSN in the combo node or the RAT information being used by the UE in the connecting state.

2) If the UE has performed the tracking area update in the combined MME/SGSN, i.e., the UE having already performed the routing area update and the tracking area update in the combined MME/SGSN currently, the combo node returns the IMS VOIP capability of the routing area and the tracking area in which the UE currently registers to the HSS. Furthermore, the combo node can also feed back the registration time of the UE in the 2G/3G network and the EPS network, last time when the UE interacts with the MME and the SGSN, and the information whether the UE is currently in the connecting state in the 2G/3G network and the EPS network to the HSS, and notify the HSS of the RAT used when last time the UE in the idle state interacted with the SGSN in the combo node or the RAT information being used by the UE which is in the connecting state.

Step 7C4, the HSS feeds back the above information obtained from the combined MME/SGSN to the AS at the request of the AS.

Step 7C5, the AS performs the domain selection during the terminated call according to the information provided by the HSS.

Preferable Embodiment 3

Figure 8:
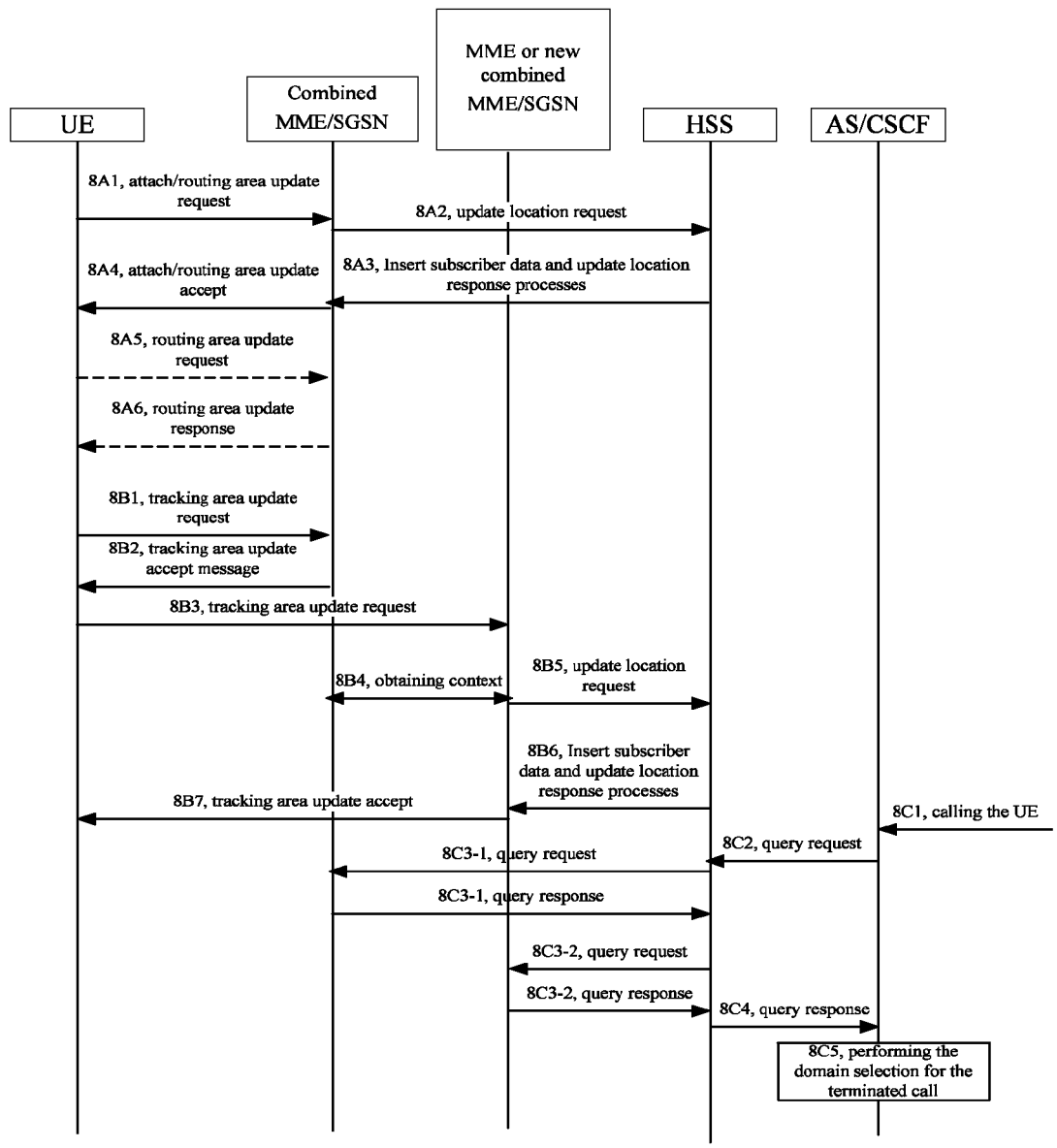
FIG. 8 is a schematic flowchart of a method for implementing domain selection during a terminated call under a combined MME/SGSN scene according to Preferable Embodiment 3 of the present invention.

FIG. 8 is a schematic diagram of a flow of a method for implementing domain selection during a terminated call under a combined MME/SGSN scene according to Preferable Embodiment 3 of the present invention. The scene is a circumstance that a UE firstly accesses a same combined MME/SGSN in both a 2G/3G network and an EPS network, and then moves in the EPS network and accesses to another MME or another combined MME/SGSN. As shown in FIG. 8, the method comprises the steps as follows.

Assuming that the UE powers on or performs attaching by inserting an SIM card under the combined MME/SGSN in the 2G/3G network, or the UE moves to a area covered by the combined MME/SGSN to update a routing area.

Steps 8A1-8A6 are a process that the UE performs the attach/update in the 2G/3G network.

Step 8A1, the UE performs the attach/routing area update in the 2G/3G network.

Step 8A2, user context does not exist in the combined MME/SGSN; and the combined MME/SGSN sends an update location message to an HSS, and indicates in the message that the node is a combo node.

Step 8A3, the HSS interacts with the combined MME/SGSN, so as to return an update location response and insert subscriber data.

Step 8A4, the combined MME/SGSN sends an attach/routing area update accept message to the UE to complete the attach/update process.

When the UE moves to a new routing area, the following steps will be performed.

Step 8A5, the UE performs a routing area update process, and sends a routing area update message to the combined MME/SGSN.

Step 8A6, the combined MME/SGSN receives the routing area update message, performs the corresponding location update process, and sends a routing area update accept message to the UE.

Steps 8B1-8B7 are a process that the UE performs update in the EPS network.

The UE moves to the EPS network and accesses the EPS network; and it is assumed that the tracking area in which the UE is currently located is in the management range of the combined MME/SGSN which has performed the routing area update already.

Step 8B1, the UE initiates a tracking area update process. The tracking area update request message sent by the UE is routed to the combined MME/SGSN according to the related art.

Step 8B2, the combined MME/SGSN receives the tracking area update request message sent by the UE and processes it accordingly. In the process, the ISR may be activated. The combined MME/SGSN sends a tracking area update accept message to the UE. Since the combined MME/SGSN has performed the location update and insert subscriber data processes with the HSS, the combined MME/SGSN will not interact with the HSS any more.

The UE moves into a tracking area which is not in the registered tracking area list. Since the tracking area is not updated, the UE initiates the tracking area update. If the tracking area is not in the management range of the combined MME/SGSN, but in the management range of another new MME or combined MME/SGSN, the process is as shown in Steps 8B3-8B7.

Step 8B3, the UE initiates the tracking area update process, and sends the tracking area update message to the MME or the new combined MME/SGSN.

Step 8B4, the MME or the new combined MME/SGSN finds the combined MME/SGSN where the UE originally registered according to the information carried in the message sent by the UE, and obtains the UE context from the combined MME/SGSN.

Step 8B5, since the user context does not exist in the MME or in the new combined MME/SGSN, the MME or the new combined MME/SGSN sends the update location message to the HSS.

Step 8B6, the insert subscriber data and the update location response processes are performed between the HSS and the MME or between the HSS and the new combined MME/SGSN.

Step 8B7, the MME or the new combined MME/SGSN sends the tracking area update accept message to the UE.

Subsequently, the UE may move, power on and power off in the network to perform a flow which is similar to the above-mentioned attach/update flow, which is very easy for those skilled in the art to know, so unnecessary details will not be repeated here any more until a CSCF/AS receives a request for calling the UE and the domain selection is required. The following Steps 8C1-8C5 are a flow that the CSCF/AS receives an incoming call request and performs the domain selection during the terminated call according to the method of the present invention. The flow of the steps 8C1-8C5 is similar to the flow of the steps 6C1-6C5 as shown in FIG. 6, so unnecessary details will not be repeated here any more.

In all the above-mentioned preferable embodiments, the methods and the flows of the present invention are described by taking the circumstance that the UE performs the attach/update at the SGSN in the 2G/3G network at first and then moves to the EPS network to perform update at the MME as an example. The methods and the flows that the UE performs the attach/update at the MME in the EPS network at first and then moves to the 2G/3G network to perform update at the SGSN are similar to the above-mentioned methods and flows, so unnecessary details will not be repeated here any more.

In the above-mentioned embodiments, the AS and the HSS initiate the query process each time when the domain selection is performed during the terminated call. The method of the present invention can also evolve into a plurality of implementation modes as follows.

The AS saves the queried information of the UE, and performs the domain selection during the terminated call according to the saved information without performing the query for a certain time period (e.g. for 10 minutes, and so on); or the AS can make a decision according to the results of the domain selection of the UE for the last few times.

The HSS saves the related information, and can stop querying the MME and/or the SGSN for a certain time period.

The MME/SGSN and the combined MME/SGSN send, to the HSS, the information of the terminal and/or the network accessed by the terminal by carrying the information of the terminal and/or the network accessed by the terminal in the update location request message sent from The MME/SGSN and the combined MME/SGSN to the HSS. The HSS saves the information, and determines not to perform the query for a certain time period.

Figure 9:
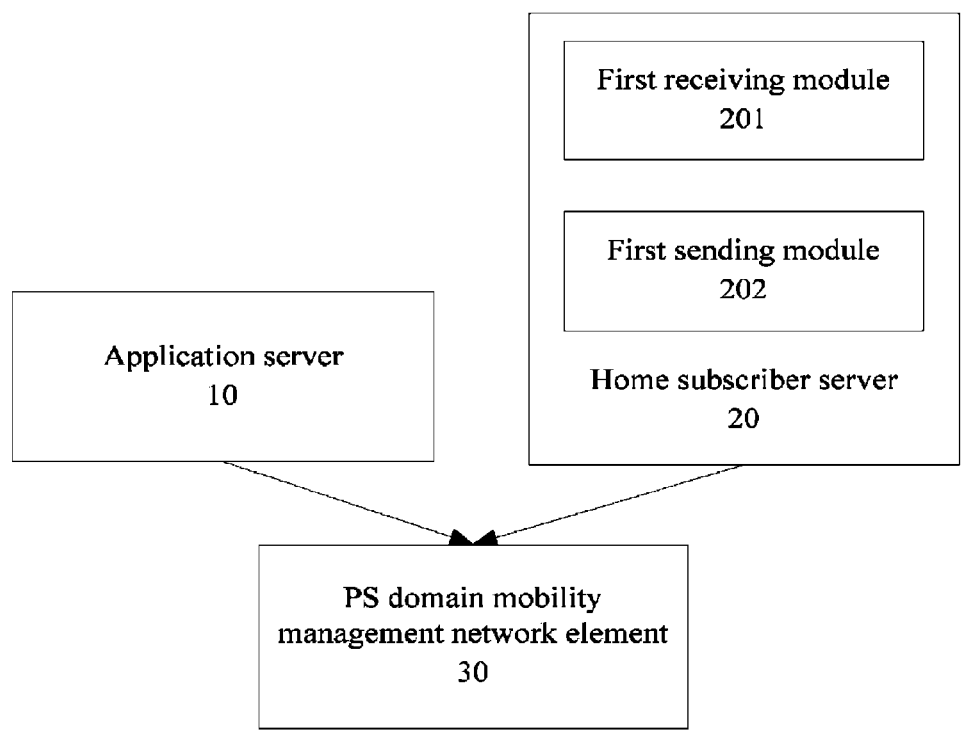
FIG. 9 is a schematic diagram of a system for implementing domain selection during a terminated call according to the embodiments of the present invention.

FIG. 9 is a schematic diagram of a system for implementing domain selection during a terminated call according to the embodiments of the present invention. As shown in FIG. 9, the system comprises:

an application server (AS) 10, configured to send a query request message to a home subscriber server (HSS) 20 according to a received call request message, and to select a domain to which a call message is to be routed according to information of a called terminal and/or a network accessed by the called terminal fed back by the HSS;

the home subscriber server (HSS) 20, configured to query, according to the query request message, a PS domain mobility management network element 30 to obtain the information of the called terminal and/or the network accessed by the called terminal in the call request message, and to feed back the obtained information of the called terminal and/or the network accessed by the called terminal to the AS; and the PS domain mobility management network element 30.

In the embodiment, during the terminated call, when the AS receives the call request and selects the domain, the HSS queries the PS domain mobility management network element to obtain the IMS VOIP capability of the network area in which the called terminal currently registers after the HSS receives the query message from the AS. After the PS domain mobility management network element intercommunicates with the HSS to complete the location update process, the UE is free from sending related information to the HSS each time the IMS VOIP capability of the network area to which the UE currently accesses changes. Therefore, the present invention solves the problem that the signaling loads between the SGSN/MME and the HSS is comparatively greatly generated by the requirement that the SGSN and the MME are also required to send a message to the HSS in the related art when the IMS VOIP capability of the routing area and tracking area to which the UE accesses changes. Since the users receive comparatively fewer calls, the embodiment of the present invention can greatly reduce the number of the signalings between the PS domain mobility management network element and the HSS, avoids various limitations of the signaling loads generated by the HSS on network deployment, is convenient for the network deployment, and ensures the implementation of services.

Figure 10:
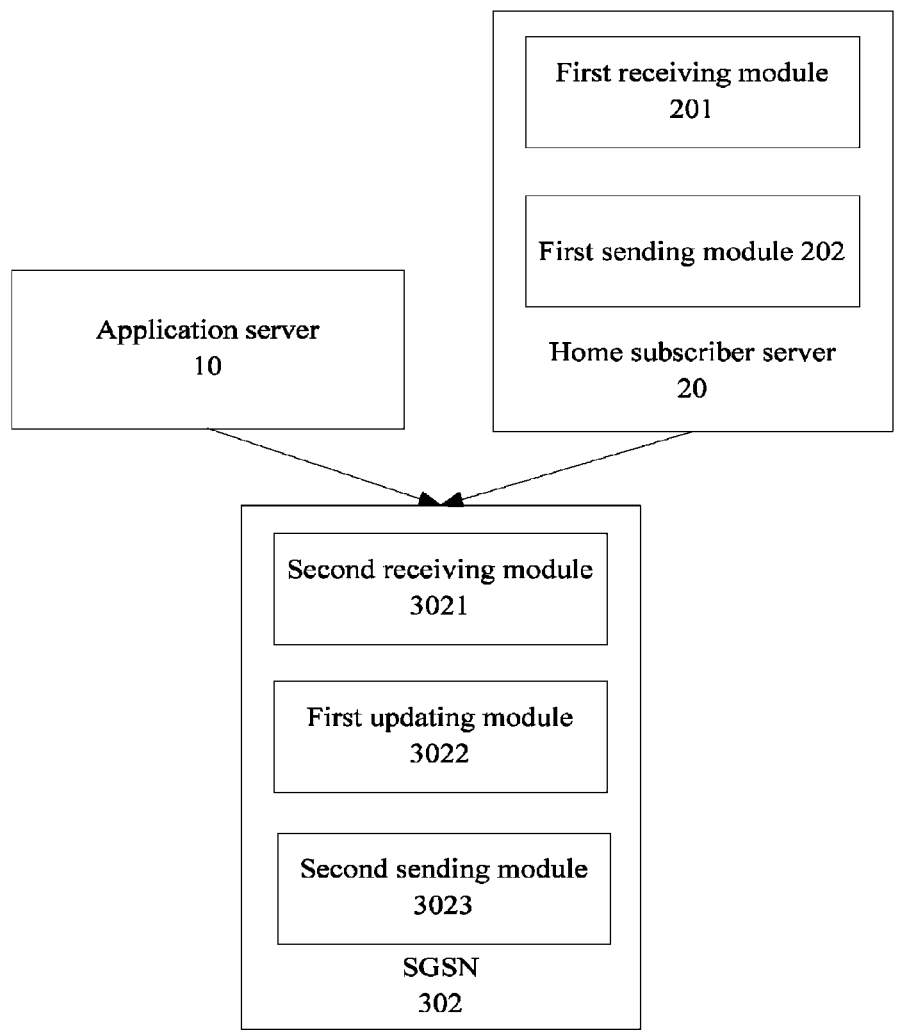
FIG. 10 is a schematic diagram of a system for implementing domain selection during a terminated call according to one embodiment of the present invention.
Figure 11:
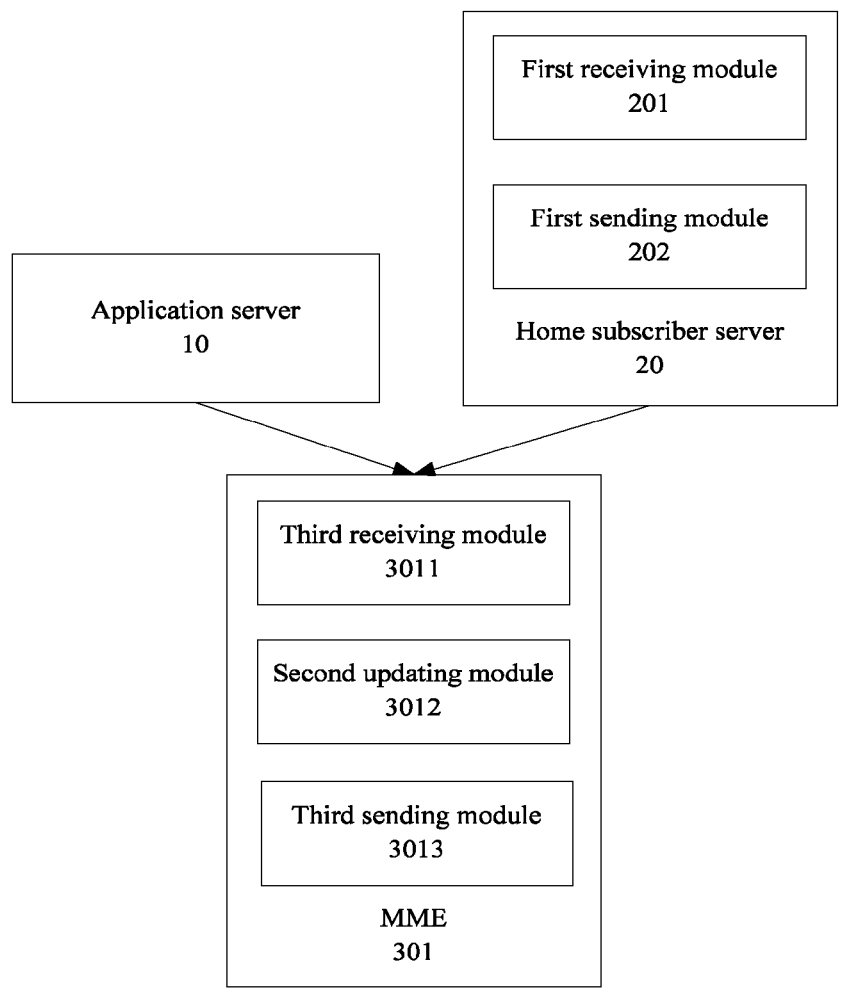
FIG. 11 is a schematic diagram of a system for implementing domain selection during a terminated call according to another embodiment of the present invention.

Preferably, as shown in FIG. 10 and FIG. 11, the PS domain mobility management network element 30 is an MME 301 in an EPS network, and the PS domain mobility management network element 30 is an SGSN 302 in a 2G/3G network.

Preferably, the MME and the SGSN can be independent network elements, and can also be a combined MME/SGSN.

The HSS 20 comprises:
a first receiving module 201, configured to receive the query request message from the AS;
the first sending module 202, configured to send, according to the information of the MME and/or the information of the SGSN of the called terminal recorded in the HSS, the query request message to the MME and/or the SGSN;
the MME 301, configured to return the information of the called terminal and/or the network accessed by the called terminal to the HSS when the MME receives the query request message from the HSS; and
the SGSN 302, configured to return the information of the called terminal and/or the network accessed by the called terminal to the HSS when the SGSN receives the query request message from the HSS.

Preferably, the above information of the network accessed by the called terminal comprises: IMS VOIP capability of a network area in which the called terminal registers currently; the above information of the called terminal comprises at least one of the following: registration time of the called terminal, last time when the called terminal interacted with a network, a radio access technology (RAT) used for access by the called terminal last time, whether idle mode signaling redundancy (ISR) being activated, state information indicating whether the called terminal is currently in a connecting state, and a radio access technology (RAT) used when last time the called terminal accessed a 2G/3G common routing area; the above information of the network accessed by the called terminal can also comprise: an indicator of a 2G/3G common routing area of a routing area in which the called terminal registers currently. When the UE is in the connecting state under the MME or the SGSN and the network area currently being accessed by the UE and the RAT support the IMS VOIP, the AS obtains the above-mentioned information from the MME/SGSN through the HSS; the AS can select the domain currently being accessed by the UE in priority to perform the terminated call according to the above-mentioned information, thereby improving the accuracy of the domain selection, reducing the possibility of failure in the domain selection compared with the related art, and increasing the speed of the terminated call establishment. When the UE is in the idle state currently with the ISR being activated, and the EPS network area in which the terminal currently registers supports the IMS VOIP while the 2G/3G network area does not support the IMS VOIP, the AS performs the terminated call through the PS access mode and the CS mode of the 2G/3G in parallel. In this way, the process of trying different domains in serial is changed into trying different domain in parallel, and the speed of the terminated call is effectively improved.

Preferably, when the terminal moves from one routing area to another routing area and sends the SGSN a routing area update message to perform routing area update,
as shown in FIG. 10, the SGSN 302 comprises:
a second receiving module 3021, configured to receive the routing area update message from the terminal;
a first updating module 3022, configured to update location information of the terminal according to the routing area update message; and
a second sending module 3023, configured to send a routing area update accept message to the terminal.

Preferably, when the terminal moves into a tracking area in the EPS network which is not in the registered tracking area list and sends a tracking area update message to the MME to update the tracking area,
as shown in FIG. 11, the MME 301 comprises:
a third receiving module 3011, configured to receive the tracking area update message from the terminal;
a second updating module 3012, configured to update location information of the terminal according to the tracking area update message; and
a third sending module 3013, configured to send a tracking area update accept message to the terminal.

The query mechanism newly added between the HSS and the MME/SGSN by the present invention not only can be used for the HSS obtaining the IMS VOIP information of the network area accessed by the UE from the MME/SGSN during the domain selection of the terminated call, but also can be used to perform the other services under the scene that the HSS needs to query information related to the UE from the MME/SGSN.

It can be concluded from the above description that the present invention achieves the following technical effects.
(1) During the terminated call, when the domain selection is performed by the method of querying the MME and/or the SGSN through the HSS, the number of signalings between the MME/SGSN and the HSS is reduced, which is favorable for the EPS network deployment and the application of the technology.
(2) The number of the signalings between the MME and/or the SGSN and the HSS can be greatly reduced, various limitations of the signaling loads generated by the HSS on network deployment are avoided, the network deployment is convenient, and the implementation of services is ensured.
(3) The accuracy of the domain selection is improved, the possibility of failure in the domain selection is reduced, and the speed of the terminal call establishment is increased.
(4) The process of trying different domains in serial is changed into trying different domain in parallel, and the speed of the terminated call establishment is effectively increased.
(5) The query mechanism newly added between the HSS and the MME/SGSN not only can be used for the HSS obtaining the IMS VOIP information of the network area accessed by the UE from the MME/SGSN during the domain selection of the terminated call, but also can be used to perform other services under the scene that the HSS needs to query information related to the UE from the MME/SGSN.

Obviously, those skilled in the art shall understand that individual modules and individual steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, wherein under some certain circumstances, the steps shown or described in the description can be executed by the sequences different from the above-mentioned sequences, or implemented by making them into integrated circuit module respectively, or by making several means or steps in to a single IC. Thus, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for implementing domain selection during a terminated call, comprising:
   an application server (AS) sending a query request message to a home subscriber server (HSS);
   the HSS querying a packet switching (PS) domain mobility management network element to obtain information of a called terminal and/or a network accessed by the called terminal, wherein the PS domain mobility management network element is a mobility management entity (MME) and/or a serving general packet radio service support node (SGSN), and the information of the network accessed by the called terminal comprises IMS VOIP capability of a network area in which the called terminal currently registers, and the MME/SGSN sends a message to the HSS to indicate the IMS VOIP capability only when the HSS queries the change of the IMS VOIP capability, then the MME/SGSN sends a message to the HSS to indicate the IMS VOIP capability;
   the HSS feeding back the obtained information of the called terminal and/or the network accessed by the called terminal to the AS; and
   the AS selecting a domain to which a call message is to be routed according to the information of the called terminal and/or the network accessed by the called terminal.

2. The method according to claim 1, wherein
   the step of the HSS querying the PS domain mobility management network element to obtain the information of the called terminal and/or the network accessed by the called terminal comprises:
   the HSS receiving the query request message;
   the HSS sending, according to information of the MME and/or information of the SGSN of the called terminal recorded in the HSS, the query request message to the MME and/or the SGSN;
   when the MME receives the query request message, the MME returning the information of the called terminal and/or the network accessed by the called terminal to the HSS; and
   when the SGSN receives the query request message, the SGSN returning the information of the called terminal and/or the network accessed by the called terminal to the HSS.

3. The method according to claim 2, wherein the MME and the SGSN are independent network elements or a combined (combo) node, wherein the combo node is a combined MME/SGSN.

4. The method according to claim 2, wherein the step of the HSS feeding back the obtained information of the called terminal and/or the network accessed by the called terminal to the AS comprises:
   the HSS receiving the information of the called terminal and/or the network accessed by the called terminal from the MME and the SGSN;
   the HSS obtaining, according to the received information of the called terminal and/or the network accessed by the called terminal sent by the MME and the SGSN, the information or a combination of the information sent by the MME or the SGSN which is accessed and/or updated by the called terminal lastly; and
   the HSS feeding back the information or the combination of the information to the AS.

5. The method according to claim 3, wherein when the combo node receives the query request message from the HSS, and a user equipment (UE) currently performs tracing area (TA) and routing area (RA) registrations at the same time in the combo node, the combo node returns the information of the called terminal and/or the network accessed by the called terminal to the HSS by a response message.

6. The method according to claim 1, wherein the step of the HSS feeding back the obtained information of the called terminal and/or the network accessed by the called terminal to the AS comprises:
   the HSS receiving the information of the called terminal and/or the network accessed by the called terminal from the MME and the SGSN;
   the HSS obtaining, according to the received information of the called terminal and/or the network accessed by the called terminal sent by the MME and the SGSN, the information or a combination of the information sent by the MME or the SGSN which is accessed and/or updated by the called terminal lastly; and
   the HSS feeding back the information or the combination of the information to the AS.

7. The method according to claim 1, wherein the information of the called terminal comprises at least one of the following:
   registration time of the called terminal, last time when the called terminal interacted with the network, a radio access technology (RAT) used for access by the called terminal last time, whether idle mode signaling redundancy (ISR) being activated, state information indicating whether the called terminal is currently in a connecting state, and an RAT used by the called terminal last time when the called terminal accessed a 2G/3G common routing area; and
   the information of the network accessed by the called terminal further comprises:
   an indicator of the 2G/3G common routing area of a routing area in which the called terminal registers currently.

8. The method according to claim 7, wherein the step of the AS selecting the domain to which the call message is to be routed according to the information of the called terminal and/or the network accessed by the called terminal comprises:
   when the AS acquires that the called terminal is in the connecting state under the MME and the network area currently being accessed by the terminal supports the IMS VOIP, the AS selecting the domain currently being accessed by the terminal to perform the terminated call; or
   when the AS acquires that the terminal is in the connecting state under the SGSN and the network area currently being accessed by the terminal and the RAT supports the IMS VOIP, the AS selecting the domain currently being accessed by the terminal to perform the terminated call.

9. The method according to claim 7, wherein the step of the A5 selecting the domain to which the call message is to be routed according to the information of the called terminal and/or the network accessed by the called terminal comprises:
   when the AS acquires that the terminal is in an idle state currently with the ISR being activated and an evolved packet system (EPS) network area in which the terminal currently registers supports the IMS VOIP while a 2G/3G network area does not support the IMS VOIP, the AS performing the terminated call by both a PS access mode and a 2G/3G circuit witching (CS) mode in parallel.

10. The method according to claim 7, wherein the step of the AS selecting the domain to which the call message is to be routed according to the information of the called terminal and/or the network accessed by the called terminal comprises at least one of the followings:

when the AS acquires that the ISR is not activated, the network area in which the called terminal registered last time is a tracking area which supports the IMS VOIP, the AS performing the routing through an EPS;

when the AS acquires that the ISR is not activated and the network area in which the called terminal registered last time is a tracking area which does not support the IMS VOIP, the AS performing the routing through an EPS or a CS domain of 2G/3G, or through the EPS and the CS domain of the 2G/3G at the same time;

when the AS acquires that the ISR is not activated and the network area in which the called terminal registered last time is a routing area which is not the 2G/3G common routing area and supports the IMS VOIP, the AS performing the routing through the PS domain of the 2G/3G;

when the AS acquires that the ISR is not activated and the network area in which the called terminal registered last time is a routing area which is not the 2G/3G common routing area and does not support the IMS VOIP, the AS performing the routing through the CS domain of the 2G/3G;

when the AS acquires that the ISR is not activated and the network area in which the called terminal registered last time is a routing area which is the 2G/3G common routing area and supports the IMS VOIP, the AS performing the routing through the PS domain of the 2G/3G, the CS domain of the 2G/3G, or the PS domain and the CS domain of the 2G/3G at the same time;

when the AS acquires that the ISR is not activated and the network area in which the called terminal registered last time is a routing area which is the 2G/3G common routing area and does not support the IMS VOIP, the AS performing the routing through the CS domain of the 2G/3G;

when the AS acquires that the ISR is activated, all the network areas in which the called terminal currently registers support the IMS VOIP, and a routing area in which the called terminal currently registers is not the 2G/3G common routing area, the AS performing the routing through the PS domain;

when the AS acquires that the ISR is activated, all the network areas in which the called terminal currently registers support the IMS VOIP, and a routing area in which the called terminal currently registers is the 2G/3G common routing area, the AS performing the routing through the PS domain, or the PS domain and the CS domain at the same time;

when the AS acquires that the ISR is activated, all the network areas in which the called terminal currently registers support the IMS VOIP, and a routing area in which the called terminal currently registers is the 2G/3G common routing area, the AS performing further judgment according to the state information of the called terminal, wherein when the called terminal is in the connecting state under the MME, the AS selects the PS domain to perform the routing; when the called terminal is in the connecting state under the SGSN and the RAT currently used is the 2G, the AS selects a CS domain to perform the routing; when the called terminal is in the connecting state under the SGSN and a RAT currently used is the 3G, the AS selects the PS domain to perform the routing; and when the called terminal is in the idle state, the AS selects the PS domain, or the PS domain and the CS domain at the same time to perform the routing;

when the AS acquires that the ISR is activated and none of the network areas in which the called terminal currently registers supports the IMS VOIP, the AS performing the routing through the CS domain of the 2G/3G;

when the AS acquires that the ISR is activated, the tracking area in which the called terminal currently registers supports the IMS VOIP, the routing area in which the called terminal currently registers does not support the IMS VOIP, and the called terminal is currently in the idle state, the AS performing the routing through the PS domain or the CS domain, or through the PS domain and the CS domain at the same time;

when the AS acquires that the ISR is activated, the tracking area in which the called terminal currently registers supports the IMS VOIP, the routing area in which the called terminal currently registers does not support the IMS VOIP, and the called terminal is currently in the connecting state under the MME, the AS performing the routing through the PS domain;

when the AS acquires that the ISR is activated, the tracking area in which the called terminal currently registers supports the IMS VOIP, the routing area in which the called terminal currently registers does not support the IMS VOIP, and the called terminal is currently in the connecting state under the SGSN, the AS performing the routing through the CS domain of the 2G/3G;

when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the idle state, the AS performing the routing through the PS domain or the CS domain, or through the PS domain and the CS domain at the same time;

when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the connecting state under the MME, the AS performing the routing through the PS domain, or through the PS domain and the CS domain at the same time;

when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the connecting state under the SGSN, the AS performing the routing through the PS domain;

when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, and the called terminal is currently in the idle state, the AS performing the routing through the PS domain or the CS domain, or through the PS domain and the CS domain at the same time;

when the AS realizes that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, and the called terminal is currently in the connecting state under the MME, the AS performing the routing through the PS domain, or through the PS domain and the CS domain at the same time;

when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, the called terminal is currently in the connecting state under the SGSN, and the called terminal accesses the network by the 3G currently, the AS performing the routing through the PS domain; and when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, the called terminal is currently in the connecting state under the SGSN, and the called terminal accesses the network by the 2G currently, the AS performing the routing through the CS domain, or through the CS domain and the PS domain at the same time.

11. A system for implementing domain selection during a terminal call, comprising:
an application server (AS), configured to send a query request message to a home subscriber server (HSS) and to select a domain to which a call message is to be routed according to information of a called terminal and/or a network accessed by the called terminal fed back by the HSS;
the HSS, configured to query a packet switching (PS) domain mobility management network element to obtain the information of the called terminal and/or the network accessed by the called terminal in the call request message, and to feed back the obtained information of the called terminal and/or the network accessed by the called terminal to the AS; and
the PS domain mobility management network element;
wherein the PS domain mobility management network element is a mobility management entity (MME) and/or a serving general packet radio service support node (SGSN), and the information of the network accessed by the called terminal comprises IMS VOIP capability of a network area in which the called terminal currently registers, and the MME/SGSN sends a message to the HSS to indicate the IMS VOIP capability only when the HSS queries the change of the IMS VOIP capability, then the MME/SGSN sends a message to the HSS to indicate the IMS VOIP capability.

12. The system according to claim 11, wherein the HSS comprises:
a first receiving module, configured to receive the query request message; and
a first sending module, configured to send, according to the information of the MME and/or the information of the SGSN of the called terminal recorded in the HSS, the query request message to the MME and/or the SGSN;
the MME, configured to return the information of the called terminal and/or the network accessed by the called terminal to the HSS when receiving the query request message; and
the SGSN, configured to return the information of the called terminal and/or the network accessed by the called terminal to the HSS when receiving the query request message.

13. The system according to claim 11, wherein
the information of the network accessed by the called terminal further comprises:
an indicator of a 2G/3G common routing area of a routing area in which the called terminal registers currently; and
the information of the called terminal comprises at least one of the following:
registration time of the called terminal, last time when the called terminal interacted with a network, a radio access technology (RAT) used by the called terminal last time, whether idle mode signaling redundancy (ISR) being activated, state information indicating whether the called terminal is currently in a connecting state, and a radio access technology (RAT) used when last time the called terminal accessed a 2G/3G common routing area.

14. The system according to claim 12, wherein
the information of the network accessed by the called terminal further comprises:
an indicator of a 2G/3G common routing area of a routing area in which the called terminal registers currently; and
the information of the called terminal comprises at least one of the following:
registration time of the called terminal, last time when the called terminal interacted with a network, a radio access technology (RAT) used by the called terminal last time, whether idle mode signaling redundancy (ISR) being activated, state information indicating whether the called terminal is currently in a connecting state, and a radio access technology (RAT) used when last time the called terminal accessed a 2G/3G common routing area.

15. The method according to claim 4, wherein the information of the called terminal comprises at least one of the following:
registration time of the called terminal, last time when the called terminal interacted with the network, a radio access technology (RAT) used for access by the called terminal last time, whether idle mode signaling redundancy (ISR) being activated, state information indicating whether the called terminal is currently in a connecting state, and an RAT used by the called terminal last time when the called terminal accessed a 2G/3G common routing area; and
the information of the network accessed by the called terminal further comprises:
an indicator of the 2G/3G common routing area of a routing area in which the called terminal registers currently.

16. The method according to claim 15, wherein the step of the AS selecting the domain to which the call message is to be routed according to the information of the called terminal and/or the network accessed by the called terminal comprises:
when the AS acquires that the called terminal is in the connecting state under the MME and the network area currently being accessed by the terminal supports the IMS VOIP, the AS selecting the domain currently being accessed by the terminal to perform the terminated call; or when the AS acquires that the terminal is in the connecting state under the SGSN and the network area currently being accessed by the terminal and the RAT supports the IMS VOIP, the AS selecting the domain currently being accessed by the terminal to perform the terminated call.

17. The method according to claim 15, wherein the step of the AS selecting the domain to which the call message is to be routed according to the information of the called terminal and/or the network accessed by the called terminal comprises:

when the AS acquires that the terminal is in an idle state currently with the ISR being activated and an evolved packet system (EPS) network area in which the terminal currently registers supports the IMS VOIP while a 2G/3G network area does not support the IMS VOIP, the AS performing the terminated call by both a PS access mode and a 2G/3G circuit witching (CS) mode in parallel.

18. The method according to claim 15, wherein the step of the AS selecting the domain to which the call message is to be routed according to the information of the called terminal and/or the network accessed by the called terminal comprises at least one of the followings:

when the AS acquires that the ISR is not activated, the network area in which the called terminal registered last time is a tracking area which supports the IMS VOIP, the AS performing the routing through an EPS;

when the AS acquires that the ISR is not activated and the network area in which the called terminal registered last time is a tracking area which does not support the IMS VOIP, the AS performing the routing through an EPS or a CS domain of 2G/3G, or through the EPS and the CS domain of the 2G/3G at the same time;

when the AS acquires that the ISR is not activated and the network area in which the called terminal registered last time is a routing area which is not the 2G/3G common routing area and supports the IMS VOIP, the AS performing the routing through the PS domain of the 2G/3G;

when the AS acquires that the ISR is not activated and the network area in which the called terminal registered last time is a routing area which is not the 2G/3G common routing area and does not support the IMS VOIP, the AS performing the routing through the CS domain of the 2G/3G;

when the AS acquires that the ISR is not activated and the network area in which the called terminal registered last time is a routing area which is the 2G/3G common routing area and supports the IMS VOIP, the AS performing the routing through the PS domain of the 2G/3G, the CS domain of the 2G/3G, or the PS domain and the CS domain of the 2G/3G at the same time;

when the AS acquires that the ISR is not activated and the network area in which the called terminal registered last time is a routing area which is the 2G/3G common routing area and does not support the IMS VOIP, the AS performing the routing through the CS domain of the 2G/3G;

when the AS acquires that the ISR is activated, all the network areas in which the called terminal currently registers support the IMS VOIP, and a routing area in which the called terminal currently registers is not the 2G/3G common routing area, the AS performing the routing through the PS domain;

when the AS acquires that the ISR is activated, all the network areas in which the called terminal currently registers support the IMS VOIP, and a routing area in which the called terminal currently registers is the 2G/3G common routing area, the AS performing the routing through the PS domain, or the PS domain and the CS domain at the same time;

when the AS acquires that the ISR is activated, all the network areas in which the called terminal currently registers support the IMS VOIP, and a routing area in which the called terminal currently registers is the 2G/3G common routing area, the AS performing further judgment according to the state information of the called terminal, wherein when the called terminal is in the connecting state under the MME, the AS selects the PS domain to perform the routing; when the called terminal is in the connecting state under the SGSN and the RAT currently used is the 2G, the AS selects a CS domain to perform the routing; when the called terminal is in the connecting state under the SGSN and a RAT currently used is the 3G, the AS selects the PS domain to perform the routing; and when the called terminal is in the idle state, the AS selects the PS domain, or the PS domain and the CS domain at the same time to perform the routing;

when the AS acquires that the ISR is activated and none of the network areas in which the called terminal currently registers supports the IMS VOIP, the AS performing the routing through the CS domain of the 2G/3G;

when the AS acquires that the ISR is activated, the tracking area in which the called terminal currently registers supports the IMS VOIP, the routing area in which the called terminal currently registers does not support the IMS VOIP, and the called terminal is currently in the idle state, the AS performing the routing through the PS domain or the CS domain, or through the PS domain and the CS domain at the same time;

when the AS acquires that the ISR is activated, the tracking area in which the called terminal currently registers supports the IMS VOIP, the routing area in which the called terminal currently registers does not support the IMS VOIP, and the called terminal is currently in the connecting state under the MME, the AS performing the routing through the PS domain;

when the AS acquires that the ISR is activated, the tracking area in which the called terminal currently registers supports the IMS VOIP, the routing area in which the called terminal currently registers does not support the IMS VOIP, and the called terminal is currently in the connecting state under the SGSN, the AS performing the routing through the CS domain of the 2G/3G;

when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the idle state, the AS performing the routing through the PS domain or the CS domain, or through the PS domain and the CS domain at the same time;

when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the connecting state under the MME, the AS performing the routing through the PS domain, or through the PS domain and the CS domain at the same time;

when the AS acquires that the ISR is activated, the tracking area in which the called terminal currently registers does not support the IMS VOIP, the routing area in which the called terminal currently registers supports the IMS VOIP, the routing area in which the called terminal currently registers is not the 2G/3G common routing area, and the called terminal is currently in the connecting state under the SGSN, the AS performing the routing through the PS domain;

when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, and the called terminal is currently in the idle state, the AS performing the routing through the PS domain or the CS domain, or through the PS domain and the CS domain at the same time;

when the AS realizes that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, and the called terminal is currently in the connecting state under the MME, the AS performing the routing through the PS domain, or through the PS domain and the CS domain at the same time;

when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, the called terminal is currently in the connecting state under the SGSN, and the called terminal accesses the network by the 3G currently, the AS performing the routing through the PS domain; and when the AS acquires that the ISR is activated, the tracking area in which the called terminal currently registers does not support the IMS VOIP, the routing area in which the called terminal currently registers supports the IMS VOIP, the routing area in which the called terminal currently registers is the 2G/3G common routing area, the called terminal is currently in the connecting state under the SGSN, and the called terminal accesses the network by the 2G currently, the AS performing the routing through the CS domain, or through the CS domain and the PS domain at the same time.

* * * * *